US012760472B2

(12) United States Patent
Goldberg et al.

(10) Patent No.: US 12,760,472 B2
(45) Date of Patent: Oct. 13, 2026

(54) MULTIAXIS 3D PRINTING OF POROUS MOLDS FOR MOLDED FIBER PART MANUFACTURING

(71) Applicant: Miso Robotics, Inc., Pasadena, CA (US)

(72) Inventors: Joshua Gouled Goldberg, San Carlos, CA (US); Alexander John Garden, San Carlos, CA (US)

(73) Assignee: Miso Robotics, Inc., Pasadena, CA (US)

(*) Notice: Subject to any disclaimer, the term of this patent is extended or adjusted under 35 U.S.C. 154(b) by 0 days.

(21) Appl. No.: 18/701,133

(22) PCT Filed: Oct. 12, 2022

(86) PCT No.: PCT/US2022/077950

§ 371 (c)(1),
(2) Date: Apr. 12, 2024

(87) PCT Pub. No.: WO2023/064797

PCT Pub. Date: Apr. 20, 2023

(65) Prior Publication Data

US 2024/0352679 A1 Oct. 24, 2024

Related U.S. Application Data

(60) Provisional application No. 63/254,781, filed on Oct. 12, 2021.

(51) Int. Cl.
*B29C 33/38* (2006.01)
*B33Y 80/00* (2015.01)
(Continued)

(52) U.S. Cl.
CPC ................. *D21J 5/00* (2013.01); *B33Y 80/00* (2014.12); *D21J 3/00* (2013.01)

(58) Field of Classification Search
CPC ............ B29C 33/3814; B29C 33/3842; B33Y 80/00
See application file for complete search history.

(56) References Cited

U.S. PATENT DOCUMENTS 132,808 A 11/1872 Currier
1,236,360 A 8/1917 Rice
(Continued)

FOREIGN PATENT DOCUMENTS

AU 2587077 A 12/1978
AU 2018211256 A1 2/2019
(Continued)

OTHER PUBLICATIONS

International Search Report and Written Opinion for International Patent Application No. PCT/US2022/077950, dated Jan. 11, 2023 (9 pages).

(Continued)

*Primary Examiner* — James Sanders
(74) *Attorney, Agent, or Firm* — Batt IP A Law Corporation; Richard Batt

(57) ABSTRACT

A method of making 3D printed porous mold or filters are disclosed in which the external surface of the mold/filter is formed by a single printed layer of material. Supporting layers are then laid down on the surface layer in way that creates a porous body that of substantially uniform porosity across the entire mold/filter surface. Use of such porous bodies as screens on molds for the manufacture of molded fiber parts are described as well as general uses as filters having 3D exterior surfaces.

19 Claims, 11 Drawing Sheets

(51) Int. Cl.
*D21J 3/00* (2006.01)
*D21J 5/00* (2006.01)

(56) References Cited

U.S. PATENT DOCUMENTS

| | | | |
|---|---|---|---|
| 1,587,288 | A | 6/1926 | Dooly |
| 1,718,668 | A | 6/1929 | Smythe |
| D101,166 | S | 9/1936 | Forsberg |
| 2,301,510 | A | 11/1942 | Bolen |
| 3,132,423 | A | 5/1964 | Artus |
| 3,155,303 | A | 11/1964 | Fenkel |
| 3,268,198 | A | 8/1966 | Swett |
| 3,392,468 | A | 7/1968 | Wolf |
| D213,898 | S | 4/1969 | Monaco |
| 3,442,433 | A | 5/1969 | Lester et al. |
| D215,766 | S | 10/1969 | Dusek |
| 3,664,256 | A | 5/1972 | Peirce |
| D223,854 | S | 6/1972 | Swett |
| 3,755,213 | A | 8/1973 | Kendall et al. |
| RE28,059 | E | 7/1974 | Mounts et al. |
| 3,929,564 | A | 12/1975 | Reifers |
| 3,954,178 | A | 5/1976 | Mason, Jr. |
| 3,985,991 | A | 10/1976 | Levinson |
| D242,108 | S | 11/1976 | Dart et al. |
| D243,912 | S | 4/1977 | Daenen |
| D244,065 | S | 4/1977 | Daenen |
| D245,384 | S | 8/1977 | Ashton |
| 4,061,241 | A | 12/1977 | Retelny |
| 4,120,398 | A | 10/1978 | Braddon, Sr. |
| 4,127,189 | A | 11/1978 | Shumrak et al. |
| D252,008 | S | 6/1979 | Jeambey |
| 4,197,940 | A | 4/1980 | DeRossett |
| D260,492 | S | 9/1981 | Scott |
| 4,360,118 | A | 11/1982 | Stern |
| 4,373,633 | A | 2/1983 | Lutz, Sr. |
| 4,373,636 | A | 2/1983 | Hoffman |
| 4,498,586 | A | 2/1985 | Vitale |
| 4,632,836 | A | 12/1986 | Abbott et al. |
| 4,656,068 | A | 4/1987 | Raines |
| D292,887 | S | 11/1987 | Schouten |
| 4,816,646 | A | 3/1989 | Solomon et al. |
| 4,886,179 | A | 12/1989 | Volk |
| D306,118 | S | 2/1990 | Guerrero |
| D307,243 | S | 4/1990 | Baker |
| 4,919,477 | A | 4/1990 | Bingham et al. |
| 5,078,257 | A | 1/1992 | Carter, Jr. |
| 5,101,997 | A | 4/1992 | Bagwell et al. |
| D333,754 | S | 3/1993 | Conti |
| 5,215,775 | A | 6/1993 | Hoffman, Jr. |
| 5,271,518 | A | 12/1993 | Webb |
| 5,273,174 | A | 12/1993 | Fisher |
| D348,219 | S | 6/1994 | Goldberg |
| D350,046 | S | 8/1994 | Zimmerman |
| D353,768 | S | 12/1994 | Hayes |
| 5,377,860 | A | 1/1995 | Littlejohn et al. |
| 5,411,140 | A | 5/1995 | Byer |
| 5,423,477 | A | 6/1995 | Valdman et al. |
| D361,594 | S | 8/1995 | Salis |
| D363,219 | S | 10/1995 | Borsboom et al. |
| 5,472,139 | A | 12/1995 | Valdman et al. |
| 5,518,133 | A | 5/1996 | Hayes et al. |
| D371,276 | S | 7/1996 | Laib |
| D371,511 | S | 7/1996 | Giarracca |
| D373,704 | S | 9/1996 | Doxey |
| D375,261 | S | 11/1996 | Fiori |
| 5,603,808 | A | 2/1997 | Nishikawa |
| 5,662,237 | A | 9/1997 | Cain |
| 5,732,610 | A | 3/1998 | Halladay et al. |
| D393,801 | S | 4/1998 | Hayes et al. |
| D394,005 | S | 5/1998 | Marijnissen |
| D395,599 | S | 6/1998 | Wyslotsky |
| 5,772,070 | A | 6/1998 | Hayes et al. |
| D397,611 | S | 9/1998 | Robinson et al. |
| D398,846 | S | 9/1998 | Wyslotsky |
| D398,847 | S | 9/1998 | Wyslotsky et al. |
| D398,848 | S | 9/1998 | Wyslotsky et al. |
| 5,800,875 | A | 9/1998 | Hussong |
| D400,394 | S | 11/1998 | Banach et al. |
| 5,873,294 | A | 2/1999 | Sciuto |
| 5,878,904 | A | 3/1999 | Schweigert |
| D415,652 | S | 10/1999 | Loew et al. |
| 5,997,924 | A | 12/1999 | Olander, Jr. et al. |
| D433,334 | S | 11/2000 | Hayes et al. |
| D438,466 | S | 3/2001 | Fletcher et al. |
| D440,490 | S | 4/2001 | Lizzio |
| 6,210,531 | B1 | 4/2001 | Bradford |
| D445,687 | S | 7/2001 | Gilbertson |
| 6,257,434 | B1 | 7/2001 | Lizzio |
| 6,287,428 | B1 | 9/2001 | Gale et al. |
| D468,206 | S | 1/2003 | Weiss et al. |
| D471,100 | S | 3/2003 | Guzowski |
| D473,791 | S | 4/2003 | Loris |
| 6,568,586 | B1 | 5/2003 | VanEsley et al. |
| D475,897 | S | 6/2003 | Zettle et al. |
| 6,601,758 | B2 | 8/2003 | Lizzio |
| 6,627,862 | B1 | 9/2003 | Pedersen |
| D482,283 | S | 11/2003 | Wichmann et al. |
| D484,412 | S | 12/2003 | Willis |
| D484,749 | S | 1/2004 | Garraway |
| 6,722,836 | B2 | 4/2004 | Jager |
| D502,050 | S | 2/2005 | Munson et al. |
| 6,858,243 | B2 | 2/2005 | Blanchet et al. |
| D504,053 | S | 4/2005 | Bertulis |
| D505,596 | S | 5/2005 | Tucker et al. |
| 6,886,704 | B2 | 5/2005 | Hayes et al. |
| D507,078 | S | 7/2005 | Greenfield |
| D508,378 | S | 8/2005 | Bertulis |
| 6,957,111 | B2 | 10/2005 | Zhu et al. |
| D511,096 | S | 11/2005 | Demaggio |
| D524,662 | S | 7/2006 | Fager et al. |
| D532,689 | S | 11/2006 | Rotta |
| D535,143 | S | 1/2007 | Kortleven |
| D546,128 | S | 7/2007 | Carlson |
| D547,602 | S | 7/2007 | Yamasaki et al. |
| D549,050 | S | 8/2007 | Spencer et al. |
| D556,567 | S | 12/2007 | Templeton |
| D562,135 | S | 2/2008 | Studee |
| D563,785 | S | 3/2008 | Maki et al. |
| D573,466 | S | 7/2008 | White et al. |
| 7,505,929 | B2 | 3/2009 | Angert et al. |
| D598,714 | S | 8/2009 | Aagaard |
| 7,678,036 | B1 | 3/2010 | Malitas et al. |
| D618,562 | S | 6/2010 | Bizzell et al. |
| D620,765 | S | 8/2010 | Sudia |
| D620,766 | S | 8/2010 | Sudia |
| D621,650 | S | 8/2010 | DeLeo |
| 7,778,773 | B2 | 8/2010 | Yaqub et al. |
| D628,485 | S | 12/2010 | Golota et al. |
| 7,884,306 | B2 | 2/2011 | Leach |
| 7,900,793 | B2 | 3/2011 | Hanson et al. |
| 7,942,268 | B2 | 5/2011 | Manca |
| D641,233 | S | 7/2011 | Pugh |
| 7,984,667 | B2 | 7/2011 | Freudinger |
| D645,711 | S | 9/2011 | Sudia |
| 8,033,420 | B2 | 10/2011 | Roseblade et al. |
| D653,906 | S | 2/2012 | Bull et al. |
| D653,907 | S | 2/2012 | Backaert et al. |
| D670,162 | S | 11/2012 | Segal |
| 8,343,560 | B2 | 1/2013 | Blythe et al. |
| 8,430,262 | B2 | 4/2013 | Corbett et al. |
| D684,046 | S | 6/2013 | Meyer et al. |
| D684,462 | S | 6/2013 | Hite |
| 8,549,432 | B2 | 10/2013 | Warner |
| 8,561,823 | B1 | 10/2013 | Krupa |
| 8,567,604 | B2 | 10/2013 | Overgaad |
| D696,066 | S | 12/2013 | Parikh |
| D699,106 | S | 2/2014 | Glaser et al. |
| D701,567 | S | 3/2014 | Abdullah |
| 8,663,419 | B2 | 3/2014 | Corbett et al. |
| D702,510 | S | 4/2014 | Segal |
| 8,807,377 | B2 | 8/2014 | Corbett et al. |
| 8,858,858 | B2 | 10/2014 | Middleton et al. |
| D720,227 | S | 12/2014 | Corbett et al. |
| 8,991,635 | B2 | 3/2015 | Myerscough |

(56) References Cited

U.S. PATENT DOCUMENTS 9,005,348 B2 4/2015 Ott
9,010,621 B2 4/2015 Baker et al.
9,073,666 B2 7/2015 Petlak et al.
9,114,916 B2 8/2015 Knipe
9,126,717 B2 9/2015 Myerscough
9,126,719 B2 9/2015 Corbett et al.
D743,838 S 11/2015 Gillingham
D747,221 S 1/2016 Changpan
D748,329 S 1/2016 Bagai et al.
D749,906 S 2/2016 Lee
D751,381 S 3/2016 Torrison et al.
9,292,889 B2 3/2016 Garden
D755,577 S 5/2016 Segal
D761,103 S 7/2016 Lebon
9,387,786 B2 7/2016 Weiner et al.
9,446,889 B2 9/2016 Lopes et al.
D768,843 S 10/2016 Honeyball
D769,051 S 10/2016 Lee
D769,052 S 10/2016 Lee
D769,057 S 10/2016 Lee
D769,058 S 10/2016 Lee
9,504,340 B2 11/2016 Starr et al.
D774,900 S 12/2016 Longoni et al.
9,522,761 B2 12/2016 Baker et al.
D775,500 S 1/2017 Hogeback
D792,962 S 7/2017 Honeyball
D795,069 S 8/2017 Haddad
D795,070 S 8/2017 Haddad
9,730,555 B1 8/2017 Lee et al.
D801,176 S 10/2017 Lynd et al.
9,783,928 B2 10/2017 Zheng et al.
9,815,191 B2 11/2017 Oleynik
D804,322 S 12/2017 Fox et al.
D804,962 S 12/2017 Fox et al.
D806,575 S 1/2018 Collins et al.
D811,214 S 2/2018 Wu
D817,701 S 5/2018 Ho
D821,807 S 7/2018 Yap et al.
D827,452 S 9/2018 Collins et al.
D828,161 S 9/2018 Collins et al.
D829,512 S 10/2018 Masanek, Jr. et al.
D833,204 S 11/2018 Lee
D835,455 S 12/2018 Sedgwick
10,213,048 B2 2/2019 Lee et al.
D843,207 S 3/2019 Das et al.
D854,381 S 7/2019 Yang
D856,799 S 8/2019 Dominion et al.
D857,492 S 8/2019 Dominion et al.
D859,936 S 9/2019 Buck
D861,422 S 10/2019 Collins et al.
D866,249 S 11/2019 Chiang et al.
D870,963 S 12/2019 White et al.
D871,834 S 1/2020 Sarnoff et al.
D872,599 S 1/2020 Krueger et al.
D883,780 S 5/2020 Wu
D884,486 S 5/2020 Chiang et al.
10,654,640 B2 5/2020 Chiang et al.
D886,592 S 6/2020 Dominion et al.
D889,902 S 7/2020 Cheng
D889,903 S 7/2020 Cheng
D892,540 S 8/2020 Collins et al.
D892,633 S 8/2020 Chiang et al.
D893,247 S 8/2020 Chiang et al.
10,737,867 B2 8/2020 Chiang et al.
D900,558 S 11/2020 Chiang et al.
D918,712 S 5/2021 Bontrager et al.
D930,476 S 9/2021 Bontrager et al.
D962,059 S 8/2022 Chiang et al.
11,738,485 B2 8/2023 Gonzalez et al.
12,208,547 B2 1/2025 Bontrager et al.
12,325,158 B2 6/2025 Gonzalez et al.
12,330,350 B2 6/2025 Gonzalez et al.
12,466,603 B2 11/2025 Bontrager et al.
2001/0035275 A1 11/2001 Gale et al.
2002/0040862 A1 4/2002 Lizzio
2002/0048624 A1 4/2002 Blanchet et al.
2002/0148845 A1 10/2002 Zettle et al.
2003/0037681 A1 2/2003 Zhu et al.
2003/0160365 A1 8/2003 Brown
2005/0109653 A1 5/2005 Wnek et al.
2005/0150624 A1 7/2005 Toh et al.
2005/0153013 A1 7/2005 Lee
2005/0189350 A1 9/2005 Hayes et al.
2005/0193901 A1 9/2005 Buehler
2006/0175223 A1 8/2006 Casanovas
2006/0213916 A1 9/2006 Brown et al.
2006/0226669 A1 10/2006 Tong et al.
2007/0042075 A1 2/2007 Cavallaro
2007/0241110 A1 10/2007 Belleggia
2007/0295631 A1 12/2007 Lin et al.
2008/0023459 A1 1/2008 Leach
2008/0128313 A1 6/2008 Anderson et al.
2008/0275643 A1 11/2008 Yaqub et al.
2009/0048890 A1 2/2009 Burgh
2009/0057381 A1 3/2009 Gokhale
2009/0139678 A1 6/2009 Nilsson et al.
2009/0142523 A1 6/2009 Nilsson et al.
2009/0229180 A1 9/2009 Rich et al.
2010/0065562 A1 3/2010 Vovan
2010/0122930 A1 5/2010 Manca
2010/0170899 A1 7/2010 Mithal et al.
2010/0200591 A1 8/2010 Myerscough
2011/0036846 A1 2/2011 Corbett et al.
2011/0086141 A1 4/2011 Strilich et al.
2011/0220652 A1 9/2011 Corbett et al.
2012/0006842 A1 1/2012 Overgaag
2012/0024859 A1 2/2012 Longoni et al.
2012/0024897 A1 2/2012 Corbett et al.
2012/0031901 A1 2/2012 Dudson et al.
2012/0175367 A1 7/2012 Lopes et al.
2012/0234717 A1 9/2012 Kirkland et al.
2013/0161230 A1 6/2013 Haering et al.
2013/0256951 A1 10/2013 Buehlmeyer et al.
2013/0313257 A1 11/2013 Gartz et al.
2014/0370167 A1 12/2014 Garden
2015/0068945 A1 3/2015 Baker et al.
2015/0068946 A1 3/2015 Baker et al.
2015/0109653 A1 4/2015 Greer et al.
2015/0204020 A1 7/2015 Gordon et al.
2015/0258722 A1 9/2015 Hou
2015/0290795 A1 10/2015 Oleynik
2015/0292154 A1 10/2015 Zheng et al.
2015/0343933 A1 12/2015 Weiner et al.
2016/0162833 A1 6/2016 Garden
2016/0214778 A1 7/2016 Goodsell et al.
2016/0244917 A1 8/2016 Kuo et al.
2017/0197334 A1 7/2017 Kuo et al.
2017/0203892 A1 7/2017 Buck
2017/0275077 A1 9/2017 Chiang et al.
2017/0305232 A1 10/2017 Vorenkamp et al.
2018/0022523 A1 1/2018 Noferi et al.
2018/0029764 A1 2/2018 Chung et al.
2018/0071939 A1 3/2018 Garden et al.
2018/0093313 A1 4/2018 Hsiao et al.
2018/0105344 A1 4/2018 Chiang et al.
2018/0121037 A1 5/2018 Wajda et al.
2018/0171561 A1 6/2018 Sundblad et al.
2018/0215523 A1 8/2018 Chiang et al.
2018/0339826 A1 11/2018 Chung et al.
2018/0340296 A1 11/2018 Chung et al.
2019/0009968 A1 1/2019 Chiang et al.
2019/0031397 A1 1/2019 Grove
2019/0218711 A1 7/2019 Chung et al.
2019/0300263 A1 10/2019 Chiang et al.
2019/0315564 A1 10/2019 Chung et al.
2020/0024806 A1 1/2020 Chung et al.
2020/0101656 A1 4/2020 Fay et al.
2020/0180298 A1 6/2020 Chisena et al.
2020/0332473 A1 10/2020 Yi et al.
2021/0002055 A1 1/2021 Chiang et al.
2021/0138696 A1 5/2021 Gonzalez et al.
2022/0002951 A1 1/2022 Vandecruys
2022/0018071 A1 1/2022 Briden
2022/0072806 A1 3/2022 Intscher-Owrang et al.

(56) References Cited

U.S. PATENT DOCUMENTS

| | | | |
|---|---|---|---|
| 2023/0107827 | A1 | 4/2023 | Briden et al. |
| 2023/0364831 | A1 | 11/2023 | Goldberg et al. |
| 2025/0022931 | A1 | 1/2025 | Chen et al. |
| 2025/0033252 | A1 | 1/2025 | Bontrager et al. |
| 2025/0178244 | A1 | 6/2025 | Gonzalez et al. |
| 2025/0207335 | A1 | 6/2025 | Ridderbush et al. |
| 2025/0229314 | A1 | 7/2025 | Lebron et al. |
| 2026/0042566 | A1 | 2/2026 | Bontrager et al. |

FOREIGN PATENT DOCUMENTS

| | | | | | |
|---|---|---|---|---|---|
| CN | 2228013 | Y | | 5/1996 | |
| CN | 1280946 | A | | 1/2001 | |
| CN | 1623022 | A | | 6/2005 | |
| CN | 101342779 | A | | 1/2009 | |
| CN | 202070636 | U | | 12/2011 | |
| CN | 103603234 | A | | 2/2014 | |
| CN | 104827519 | A | | 8/2015 | |
| CN | 104831590 | A | | 8/2015 | |
| CN | 204622206 | U | | 9/2015 | |
| CN | 204690510 | U | | 10/2015 | |
| CN | 107881856 | A | | 4/2018 | |
| CN | 107915044 | A | | 4/2018 | |
| CN | 207404482 | U | | 5/2018 | |
| CN | 108265568 | A | | 7/2018 | |
| CN | 109454705 | A | | 3/2019 | |
| CN | 111254754 | A | | 6/2020 | |
| CN | 111287022 | A | | 6/2020 | |
| CN | 111395050 | A | | 7/2020 | |
| CN | 111395051 | A | | 7/2020 | |
| CN | 114096713 | A | | 2/2022 | |
| CN | 120129778 | A | | 6/2025 | |
| EP | 0433203 | A1 | | 6/1991 | |
| EP | 0559491 | A1 | | 9/1993 | |
| EP | 0732181 | A1 | | 9/1996 | |
| EP | 1240975 | A1 | | 9/2002 | |
| EP | 989067 | B1 | | 10/2002 | |
| EP | 1623929 | A1 | | 2/2006 | |
| EP | 2243723 | B1 | | 2/2012 | |
| EP | 2230184 | B1 | | 8/2012 | |
| EP | 3006370 | B1 | | 7/2018 | |
| EP | 2937462 | B1 | | 7/2019 | |
| EP | 3878889 | A1 | * | 9/2021 | ......... C08G 18/7664 |
| EP | 3985170 | A1 | | 4/2022 | |
| EP | 4265840 | A1 | | 10/2023 | |
| EP | 4493760 | B1 | | 12/2025 | |
| GB | 2456502 | A | | 7/2009 | |
| JP | S5017584 | A | | 2/1975 | |
| JP | S5542187 | A | | 3/1980 | |
| JP | h02107266 | A | | 4/1990 | |
| JP | 2001-063761 | A | | 3/2001 | |
| JP | 2002-347944 | A | | 12/2002 | |
| JP | 2010-264996 | A | | 11/2010 | |
| JP | 5244344 | B2 | | 7/2013 | |
| JP | 2015-000743 | A | | 1/2015 | |
| JP | 2016513547 | A | | 5/2016 | |
| JP | 1579421 | S | | 6/2017 | |
| JP | 1585893 | S | | 9/2017 | |
| KR | 20040045048 | A | | 6/2004 | |
| KR | 200360448 | Y1 | | 8/2004 | |
| KR | 10-2009-0098949 | A | | 9/2009 | |
| KR | 10-2015-0121771 | A | | 10/2015 | |
| KR | 20170015442 | A | * | 2/2017 | ........... B29C 64/209 |
| SE | 545309 | C2 | | 6/2023 | |
| TW | D166244 | S | | 3/2015 | |
| TW | D194812 | S | | 12/2018 | |
| TW | D198710 | S | | 7/2019 | |
| TW | D208702 | S | | 12/2020 | |
| WO | 99/22069 | A1 | | 5/1999 | |
| WO | 2003044279 | A1 | | 5/2003 | |
| WO | 2005012640 | A1 | | 2/2005 | |
| WO | 2006057609 | A1 | | 6/2006 | |
| WO | 2006057610 | A2 | | 6/2006 | |
| WO | 2011083008 | A1 | | 7/2011 | |
| WO | 2012/005683 | A1 | | 1/2012 | |
| WO | 2015/006649 | A1 | | 1/2015 | |
| WO | 2015019061 | A1 | | 2/2015 | |
| WO | 2016101976 | A1 | | 6/2016 | |
| WO | 2018237279 | A1 | | 12/2018 | |
| WO | 2020227404 | A1 | | 11/2020 | |
| WO | 2020227409 | A1 | | 11/2020 | |
| WO | WO-2021073674 | A2 | | 4/2021 | |
| WO | WO-2021201850 | A1 | | 10/2021 | |
| WO | WO-2022072555 | A1 | | 4/2022 | |
| WO | 2023064797 | A1 | | 4/2023 | |
| WO | 2023178278 | A2 | | 9/2023 | |
| WO | 2023245002 | A1 | | 12/2023 | |

OTHER PUBLICATIONS

Extended European Search report issued Jul. 15, 2025, in European Application No. 22881975.1.

"Core77 "Notable Packaging Award: Core77 Design Awards 2017, Zume Pizza 'Pizza Pod" May 14, 2017, https://web.archive.org/web/20170614144555/http://designawards.core77.com/Packag ing/62804/Zu me -Pizza-Pod, downloaded on Mar. 26, 2018, 4 pages.".

Divya, "Sealed Air and Kuraray to Invest in Capacity at Simpsonville Facility to Produce Plant-Based Food Packaging", Mar. 22, 2019, located online on May 8, 2019 at: https://packaging360.in/news/sealed-air- invests-in-to-simpsonville-facility-to-produce-pla . . . , 7 pages.

DuPont, "Compostable "Pizza Pod" (Zume Pizza, USA)—Diamond Finalist Award," May 22, 2017, downloaded from http://www.dupont.com/industries/packaging-and-printing/media/press-kits/ 2017-packag ing-awards/mc-image-detail/compostable-pizza-pod. html on Apr. 20, 2018, 1 page.

Entis et al., "This Robot-Made Pizza Is Baked in the Van on the Way to Your Door," Sep. 29, 2016, downloaded from http://fortune.com/2016/09/29/this-robot-made-pizza-is-baked-in-the-van-on-the-way- to-your-front-door/ on Apr. 20, 2018, 1 page.

Farkya, "Compostable Pizza Pod," Nov. 14, 2016, downloaded from http://www.packagingconnections.com/news/compostable-pizzapod. htm on Apr. 20, 2018, 7 pages.

IN 202117056173—First Examination Report, Aug. 11, 2023, 6 pages.

International Search Report and Written Opinion for Application No. PCT/US2023/064583, mailed Oct. 17, 2023, (11 pages).

International Search Report and Written Opinion for Application No. PCT/US2023/068343, mailed Oct. 11, 2023, (13 pages).

Kelley, Mary K., "Caffeine Fix: The Design of Coffee Cup Lids", from Mary Kate's Experience with Human Factors, found online at: https://sites.tufts.edu/mkelleyhfintro/2018/04/12/caffeine-fix-the- design-of-coffee-cup-lids/, Apr. 12, 2018, 8 pages.

Molina, "Yes, Apple really did patent its own pizza box," May 17, 2017, downloaded from https://www.usatoday.com/story/tech/talkingtech/2017/05/17/apple-patented-its-own-pizza-box/ 3272670011 on Apr. 20, 2018, 2 pages.

PCT International Search Report and Written Opinion for Application No. PCT/US2020/031667, mailed Jul. 22, 2020, (11 pages).

PCT International Search Report and Written Opinion for Application No. PCT/US2020/031675, mailed Jul. 27, 2020 (9 pages).

PCT International Search Report and Written Opinion for Application No. PCT/US2021/052731, mailed Feb. 2, 2022 (12 pages).

PW Staff, "Humanitarian initiative wins top DuPont Award," Jul. 5, 2017, downloaded from https://www.packworld.com/article/trendsand- issues/global/humanitarian-initiative-wins-top-dupont-award on Apr. 20, 2018, 12 pages.

Wiener, "Food Movers: The Secret Evolution of the Pizza Box," Feb. 2016, downloaded from https://www.foodandcity.org/evolution- pizza-box/ on Apr. 20, 2018, 14 pages.

World Centric website, "New PizzaRound from World Centric: The Pizza Box Comes Full Circle", Petaluma, CA, USA, published Mar. 15, 2018, 2 pages, located online on May 2, 2019 at: http://www.worldcentricorg/node/442.

(56) References Cited

OTHER PUBLICATIONS

Zume Pizza Homepage: Announced 2015 Online Site Visited Apr. 20, 2018, Available from Internet URL: https://zumepizza.com/, 7 pages.

* cited by examiner

MULTIAXIS 3D PRINTING OF POROUS MOLDS FOR MOLDED FIBER PART MANUFACTURING

CROSS REFERENCE TO RELATED APPLICATIONS

This application is a national stage entry of International Patent Application No. PCT/US2022/077950, filed Oct. 12, 2022, which claims priority to and the benefit of U.S. Provisional Patent Application Ser. No. 63/254,781 filed on Oct. 12, 2021, the entire disclosure of each of which is hereby incorporated by reference herein.

INTRODUCTION

Pollution caused by single use plastic containers and packaging materials is now a recognized worldwide problem. Replacing single use packaging with biodegradable and compostable materials is proposed as one way to reduce plastic pollution. However, for a new environmentally friendly replacement to be successful, it must be competitive in both cost and performance to the incumbent plastic technologies it is to replace.

By way of brief background, molded paper pulp (also referred to as molded fiber) has been used since the 1930s to make containers, trays and other packages (referred to as the "part" to be made). Paper pulp can be produced from recycled materials such as old newsprint and corrugated boxes or directly from tree and other plant fibers. Today, molded pulp parts are widely used for electronics, household goods, food packaging, automotive pieces, and medical products.

Typically, molded fiber parts are made using a forming mold, commonly referred to in the industry as a 'tool', that is the negative shape, if you will, of a side of the part. For example, a forming mold may be the negative of the inside of a bowl or an egg cartoon. Currently, forming molds are made by machining the mold body from a single piece of billet of aluminum or similar metal. Holes are then drilled through the mold body and a screen of metal mesh is attached to its surface to complete the tool. To make the molded fiber part, the forming mold is immersed into a slurry of fiber in a machine called a former. A pressure gradient is applied between the slurry and the back of tool forcing the slurry water to be drawn through the holes in the forming mold. The pressure gradient may be created by pulling a vacuum on the back side of the tool. The screen prevents the pulp from clogging the holes and a layer of fiber from the slurry collects on the screen over time as water is drawn through the forming mold. After the fiber layer is formed to a desired thickness, the forming mold with the molded fiber part is removed from the slurry. The molded fiber part is then removed from the forming mold and may be subjected to subsequent processing (e.g., transferring to other equipment, pressing, heating, drying, top coating, palletizing, labeling, trimming, and the like).

The subsequent processes in part manufacture often use one or two processing molds in which each processing mold is negative of one or the other side of the part. For example, a press may use a processing mold that closely or identically matches the forming mold and a second processing mold that defines the shape of opposite side of the part. The part ultimately takes the shape created from the space between the two molds when they are pressed together. Other processes may use only one processing mold, such as a transfer process (sometimes referred to as "pick and place" process) that moves a part from a mold on one machine to a mold on another, e.g., from the former to a press or from a press to a pallet where the parts are stacked. Although processing molds typically do not have screens like forming molds, it is typical for processing molds to have holes through which a pressure gradient can be created, e.g., to use suction to firmly draw a part onto the mold, to blow the part off the mold, or through which additional water can be removed from the part, depending on the particular process. It is common for all molds on a manufacturing line to have such holes.

The two most common types of molded pulp are classified as Type 1 and Type 2. Type 1 is commonly used for support packaging applications with 3/16 inch (4.7 mm) to ½ inch (12.7 mm) walls. Type 1 molded pulp manufacturing, also known as "dry" manufacturing, uses a fiber slurry made from ground newsprint, kraft paper, or other fibers mixed with water into a suspension. A forming mold mounted on a platen is dipped or submerged in the slurry and a vacuum is applied to the back of the forming mold. The vacuum pulls water through the mold depositing the fibers from the slurry onto the surface of the tool to form a fiber layer in the shape of the part. While still under the vacuum, the mold is removed from the slurry tank. The pressure gradient is then reversed by blowing air through the tool, which ejects the molded fiber piece. The ejected part is typically deposited onto a conveyor that moves through a drying oven (hence the term "dry manufacturing") to complete the manufacturing of the part.

Type 2 molded pulp manufacturing, also known as "wet" manufacturing, is typically used to create parts for packaging electronic equipment and household items that have 0.02 inch (0.5 mm) to 0.06 inch (1.5 mm) walls. Type 2 molded pulp uses the same materials but the molding process differs from Type 1 manufacturing in that after the initial part (referred to as the "wet part") is made on the forming mold, the wet part is moved to a press and subjected to a pressing step that compresses the fiber material between two processing molds, one of which may be the forming mold. This removes additional water, increases the density of the part, and provides an external surface finish to both sides of the part.

Type 3 molded pulp manufacturing, another form of "wet" manufacturing, includes at least one higher temperature process, such as hot pressing of the wet part or drying of the pressed part, in addition to the pressing and forming processes.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure.

DETAILED DESCRIPTION

Figure 1:
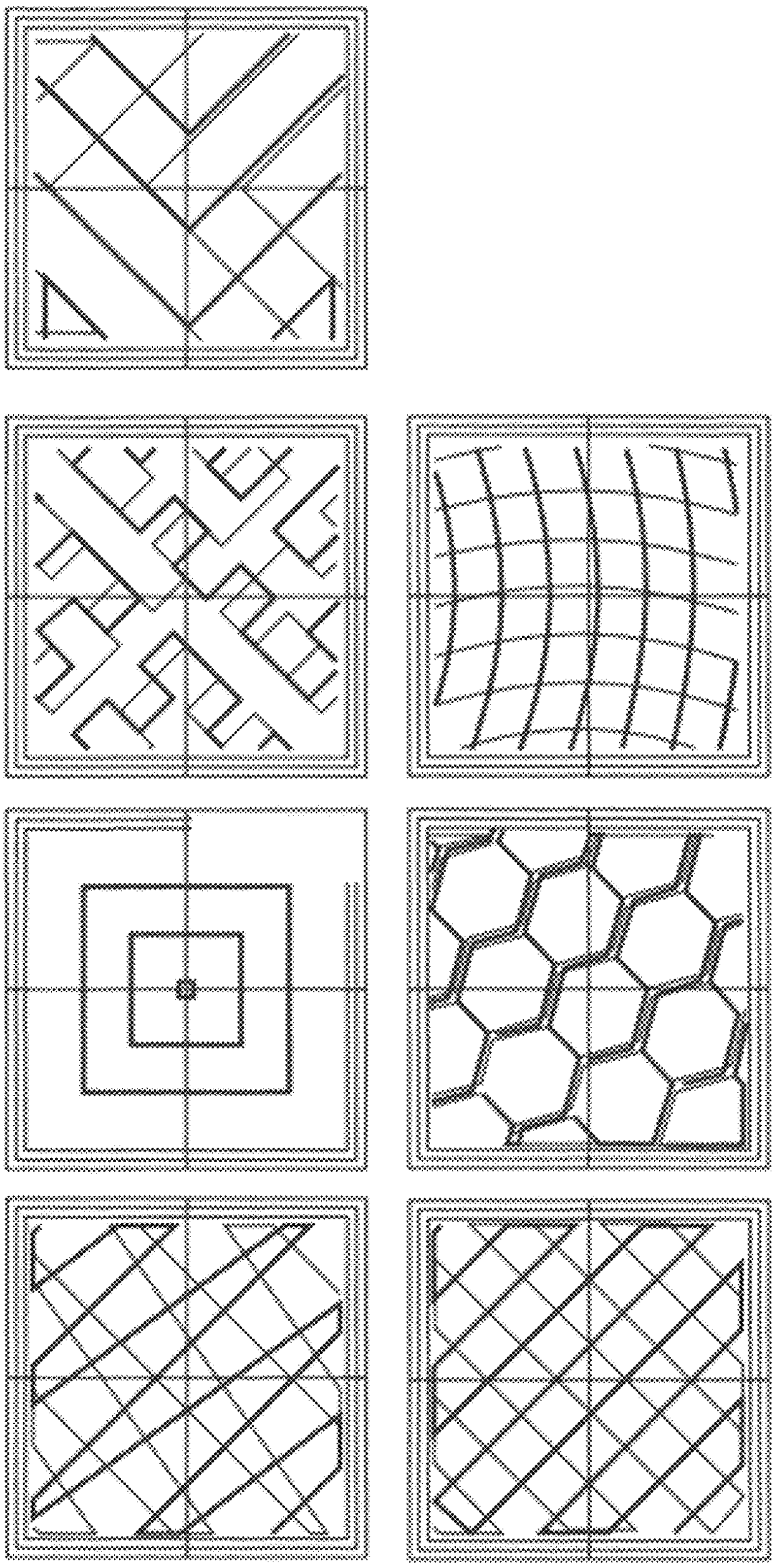
FIG. 1 PRIOR ART
FIG. 1 illustrates a number of common 2-dimensional (2D) infill patterns that can be selected and generated by slicer software programs, in this case the open source Slic3r program.

Before the porous molded fiber product molds and methods for their manufacture are disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting. It must be noted that, as used in this specification, the singular forms "a," "an," and "the" include plural referents unless the context clearly dictates otherwise. Thus, for example, reference to "a step" may include multiple steps, and reference to "producing" or "products" of a step or action should not be taken to be all of the products.

As used herein, two components may be referred to as being in "thermal communication" when energy in the form of heat may be transferred, directly or indirectly, between the two components. For example, a wall of container may be said to be in thermal communication with the material in contact with the wall. Likewise, two components may be referred to as in "fluid communication" if a fluid is or can be transferred between the two components. For example, in a circuit where liquid is flowed from a compressor to an expander, the compressor and expander are in fluid communication. Thus, given a sealed container of heated liquid, the liquid may be considered to be in thermal communication (via the walls of the container) with the environment external to the container but the liquid is not in fluid communication with the environment because the liquid is not free to flow into the environment.

One draw back of the current mold manufacturing process is the time and cost associated with creating molds by individually machining them out metal billet. Currently, molds are expensive and time consuming to manufacture. Furthermore, such molds are heavy, even if made of a light metal such as aluminum, thus requiring the processing equipment to be very strong in order to handle the weight of the molds. In addition, as mentioned above it is typical for molds, be they forming molds or processing molds, to be provided with holes through which a pressure gradient can be created. It has been determined that the size, number, and spacing of the holes (in combination with the screen in the case of forming molds) can have a significant effect on the quality of the final molded fiber part, the efficiency of the process in which the mold is used, and the consistency between parts produced by the mold. Forming molds have an additional draw back in that the screens used to prevent clogging of the holes often clog themselves, are quick to wear out, have time consuming and costly maintenance cycles, and can introduce unwanted contaminating material into the slurry or the part.

This disclosure describes systems and methods for creating porous molds using additive manufacturing processes, also referred to as three-dimensional (3D) printing. At a high level, it has been found that creating a generally porous mold, or a mold with porous regions or zones, can improve the performance of the mold and the quality of the molded fiber parts created therefrom. It has further been determined that porous molds can be created using additive manufacturing techniques through manipulation of mold manufacturing parameters such as, but not limited to, layer thickness, number of perimeter layers, fill pattern, and fill density. Through variation of these manufacturing parameters, the porosity of a mold created by an additive manufacturing device, e.g., a 3D printer, can be tailored for use with molded fiber. For example, the fill density and fill pattern parameters may be tailored to prevent entry and clogging of the mold with fibers from the fiber slurry during the part forming process, thus removing the need for a screen. A general discussion of the 3D printing of molds can be found in PCT Patent Application No. PCT/US21/52731, filed Sep. 29, 2021, titled Porous Molds for Molded Fiber Part Manufacturing and Method for Additive Manufacturing of Same, which application is hereby incorporated herein by reference.

The benefits of porous molds created from additive manufacturing techniques are many. First, the porosity of the mold can be easily adjusted. Furthermore, as this method results in a mold that is substantially homogenous, the application of the vacuum to the mold is much more evenly distributed throughout the mold, instead of being localized around the discrete holes drilled into a traditional mold. This improves the overall quality of the part created from the mold.

Second, molds can be quickly designed and manufactured. In fact, molds can be partially or completely auto-generated from a given part design and intended use. That is, given a specific computer model for a desired molded fiber part, a computer model for each of the porous forming and processing molds necessary for any particular manufacturing line can be generated using software by simply dictating the desired attributes of the molds such as porosity and shape and other details of the machine interface. Furthermore, preconfigured profiles for printer parameters can be created to tailor the porosity and surface pore sizes of the printed molds depending on the type of fiber and fiber slurry being. For example, molds for a given slurry 'A' may be printed with printer parameters previously determined to be optimized for that particular slurry composition, while molds for slurry B are automatically printed using a different set of optimal printer parameters.

Third, mold designs can be easily modified and a new mold made quickly in case a change is needed. Provided with the appropriate additive manufacturing device, a molded fiber manufacturer no longer needs to wait weeks for new molds to be machined. Inexpensive and quickly made molds will allow more flexibility and make smaller part runs more economical.

Finally, depending on the material used when molds are worn out they may be recycled and new molds created from the original material.

Additive Manufacturing

By way of background, additive manufacturing techniques, which are sometimes also referred to as 3D printing, start from a digital representation of the physical object to be formed, referred to herein as the "computer model," or simply "model" of the desired object. Models may be created using many different software packages including commonly available computer-aided design (CAD) programs such as TinkerCAD and FreeCAD. In one common technique, the model is then subdivided, or "sliced", into a series of cross-sectional horizontal layers. The layers represent the 3D object, and may be generated using additive manufacturing software executed by a computing device; the software typically referred to as a "slicer" or "slicing software." Information about the cross-sectional layers of the 3D object may be stored as cross-sectional data in a "slicer file", which is sometimes also called a g-code file after one of the many standard slicer file formats. Typically, a slicer file includes specific instructions to the printer including, but not limited to, the precise order of linear movements of the 3D printer extruder, fixation laser, or equivalent for each layer. In addition, the g-code file typically includes specific printer commands like the ones to control the extruder temperature, speed of head movement, extrusion speed if the device uses and extrusion head, and/or bed temperature.

An additive manufacturing or 3D printing machine or system can read and interpret the slicer file to build a 3D physical replica of the modeled object on a layer by layer basis. Accordingly, additive manufacturing allows for fabrication of 3D objects directly from computer models of the objects. Additive manufacturing or 3D printing provides the ability to quickly manufacture both simple and complex parts without additional tooling and without the need for assembly of different parts.

Examples of additive manufacturing include stereolithography, selective laser sintering, fused deposition modeling (FDM), droplet jetting technologies, high area rapid printing (HARP), ultraviolent light activated resin printers, and the like. Stereolithography ("SLA"), for example, utilizes a vat of liquid photopolymer "resin" to build an object a layer at a time using light to selectively photopolymerize the resin. Each layer includes a cross-section of the object to be formed. First, a layer of resin is deposited over the entire building area. For example, a first layer of resin may be deposited on a base plate of an additive manufacturing system. An electromagnetic ray then traces a specific pattern on the surface of the liquid resin. The electromagnetic ray may be delivered as one or more laser beams which are computer-controlled. Exposure of the resin to the electromagnetic ray cures, or solidifies, the pattern traced by the electromagnetic ray, and causes it to adhere to the layer below. After a coat of resin has been polymerized, the platform descends by a single layer thickness and a subsequent layer of liquid resin is deposited. A pattern is traced on each layer of resin, and the newly traced layer is adhered to the previous layer. A complete, physical 3D object may be formed by repeating this process. The solidified 3D object may be removed from the SLA system and processed further in post-processing.

Selective laser sintering ("SLS") is another additive manufacturing technique that uses a high power laser, or another focused energy source, to fuse small fusible particles of solidifiable material. In some embodiments, selective laser sintering may also be referred to as selective laser melting. In some embodiments, the high power laser may be a carbon dioxide laser for use in the processing of, for example, polymers. In some embodiments, the high power laser may be a fiber laser for use in the processing of, for example, metallic materials. Those of skill in the art will recognize that, in some embodiments, other types of high power lasers may be used depending on the particular application. The particles may be fused by sintering or welding the particles together using the high power laser. The small fusible particles of solidifiable material may be made of plastic powders, polymer powders, metal (direct metal laser sintering) powders, or ceramic powders (e.g., glass powders, and the like). The fusion of these particles yields an object that has the desired 3D shape and properties such as porosity and surface texture. For example, a first layer of powdered material may be deposited on a base plate. A laser may be used to selectively fuse the first layer of powdered material by scanning the powdered material to create and shape a first cross-sectional layer of the 3D object. After each layer is scanned and each cross-sectional layer of the object is shaped, the powder bed may be lowered by one layer of thickness, a new layer of powdered material may be applied on top of the previous layer, and the process may be repeated until the build is completed and the object is generated. The cross-sectional layers of the 3D object may be generated from a digital 3D description of the desired object. The 3D description may be provided by a CAD file or from scan data input into a computing device. The solidified 3D object may be removed from the SLS system and processed further in post-processing.

Suitable additive manufacturing materials used may include, but are not limited to, high performance polymers such as polyurethane, thermoplastic polyurethane, polypropylene, polyethylene, polyetherimide, polyamide, polyamide with additives such as glass or metal particles, including block copolymers, resorbable materials such as polymer-ceramic composites, and polyacrylamide, polystyrene, polycarbonate, polylactic acid (PLA), acrylonitrile butadiene styrene (ABS), polyoxymethylene (POM), polyvinyl chloride, polyesters. Examples of commercially available materials include: DSM Somos® series of materials 7100, 8100, 9100, 9420, 10100, 11100, 12110, 14120 and 15100 from DSM Somos: ABSplus-P430, ABSi, ABS-ESDI, ABS-M30, ABS-M30i, PC-ABS, PC-ISO, PC, any one of the high heat resistance thermoplastics sold under the trademark ULTEM® (e.g., ULTEM 1010 Resin, ULTEM 9085 CG Resin, ULTEM 9085 Resin, ULTEM 1000 Resin), PPSF, and PPSU materials from Stratasy's (note, ULTEM® is a registered trademark of SABIC Global Technologies for thermoplastic formulations which is licensed to multiple 3D filament suppliers such as Stratasy's): Stratasys compatible 3D printing filaments sold under the TriMax™ brand by TriMax3D, such as TriMax™ PEI made using ULTEM 1010 or ULTEM 9085 PEI: Accura Plastics and/or Resins, DuraForm, CastForm, Laserform and VisiJet line of materials from 3-D-Systems: metals such as aluminum, molybdenum, cobalt, chrome, iron, nickel, titanium, vanadium and alloys thereof (e.g., stainless steel): the PA line of materials, the PrimeCast and PrimePart materials, Alumide® and CarbonMide® from EOS GmbH: the PA product line of materials from Arkema, comprising Orgasol®: Invent Smooth, Rilsan® Invent Natural, Rilsan® Invent Black: Tusk Somos® SolidGrey 3000, TuskXC2700T, Tusk2700 W, Poly 1500, Xtreme, NanoTool, Protogen White, WaterClear: polyethylene, (met) acrylates, and epoxies.

In particular, materials with good thermal stability at higher temperatures (e.g., above 25° C.) materials such as polyetherimides (e.g., ULTEM 1010 PEI and TriMax™ PEI made using ULTEM 1010) and polyphenylsulfone (PPSU) (a transparent and rigid high-temperature engineering thermoplastic) are suitable for use as mold material for high temperature processes like hot pressing. Lower temperature materials such as ABS, such as ABS-M30i, and PLA are suitable for non-heated processes such as part transfer, trimming, labeling, embossing, forming, and palletizing processes. In addition, for making molded fiber parts for use in food packaging, a food safe, edible, or even digestible, material may be used for molds.

While many 3D printing machines print objects in one material, some 3D printing technologies allow for printing in more than one material (multi-material). These technologies are typically the ones relying on the principle of selective deposition of material as opposed to the ones relying on selective polymerization or melting in a bed/vat. Several examples of this technology include: FDM, Polyjet, Arburg Freefrom technology, high-area rapid printing systems from Azul™, Binderjetting technologies like Voxeljet and Z-corp, where a binding agent is jetted on a powder bed, Stratasys product line: Dimension 1200es, Dimension Elite, Fortus 250mc, Objet24, Objet30 Pro, Objet Eden260V, Objet Eden350/350V, Objet Eden500V, Objet260 Connex, Objet350 Connex, Objet500 Connex, Objet500 Connex3; 3DSytems product line: ProJet® 3510 SD, ProJet® 3510 HD, ProJet® 3510 HDPlus, ProJet® 3500 HDMax, ProJet® 5000, ProJet® 5500X, iPro™ 8000, ProX™ 950, sPro™ 140, or VX 1000 to name but a few. Technologies able to print in multi-material may be particularly suited for making molds that require different thermal properties in different locations, such as a processing mold for a hot press in which the surface of the mold needs to be maintained at a particular temperature but the temperature of the interior of the mold or at the interface with the press machine is not important. Furthermore, molds could be created with multiple materials having different properties. For example, wear surfaces may be created in a different material than non-wear surfaces due to cost savings, compressive strength, and/or durability properties of the material. Additionally, molds may be designed to have multiple parts to enable replacement of only a subset of the entire mold and these parts may each be made out of a different material having optimal properties, e.g., strength, temperature stability, durability, thermal conductivity and/or electrical conductivity or combinations thereof) for the role of that part.

Porous Molds for Molded Fiber Part Manufacturing

As described above, porous molds have benefits over traditional milled molds provided with discrete holes for air flow. Depending on the embodiment, these benefits include more uniform application of the pressure differential over the surface of the mold and reduced susceptibility to fouling with fibers from the slurry.

Porous molds could be manufactured in many ways, including using traditional milling to form a mold out of a single piece of porous material such as an open-cell ceramic material or metal foam. However, it has been determined that additive manufacturing technology may be adapted to create a 3D printed porous molds having sufficient porosity and strength to allow the molds to operate as a forming mold without the use of a metal screen and as a processing mold. Furthermore, depending on the selection of the mold material molds can be manufactured that are suitable for use in cold (15° C. and less), ambient (15-25° C.) and high temperature (25° C. up to 400° C. or even higher—noting that a typical hot press mold which may operate at temperatures in the range of from 160 to 200° C.) processes. Finally, the ease, speed and lower cost at which molds can be created using additive manufacturing all represent significant improvements over the use of traditional manufacturing to create porous molder fiber molds.

When adapting additive manufacturing systems for creating porous molds, it has been determined that porous molds may be created through selection and control of mold manufacturing parameters commonly provided by slicer software programs. One of the functions performed by the slicer software program is to allow the user to dictate how the interior of an object (the "infill", or more simply the "fill") is to be made. User settable controls specifically related to the infill include, but are not limited to, infill pattern (alternatively referred to as the fill pattern), and infill density (alternatively referred to the fill density). Through selection of a particular fill pattern and a fill density, the user can control how the infill of the mold is made. It has been determined that selection of specific combinations of fill patterns and fill densities result in porous infills that allow for fluid transfer through the interior of the mold when subjected to pressure differentials.

FIG. 1 illustrates a number of common 2-dimensional (2D) infill patterns that can be selected and generated by slicer software programs, in this case the open source Slic3r program. The figure illustrates examples of, for each particular fill pattern, where fill lines would be deposited for two successive layers of the printed object. These patterns are mathematically generated by the slicer software for each layer based on mathematical rules specific to each pattern. In addition, a slicer program may adjust the exact location or orientation of lines of fill based on the shape of the perimeter of each particular layer being made, the location of infill line on the layer or layers below a given layer, and the fill density chosen. Many patterns are known in the art in addition to those shown.

Figure 2:
PRIOR ART FIG. 2
FIG. 2 is a photograph of printed parts showing another potentially useful 2D infill pattern: the gyroid pattern.

FIG. 2 is a photograph of printed, nested parts showing another potentially useful 2D infill pattern: the gyroid pattern. The gyroid pattern an infill pattern alternates every layer and creates an equal distribution of strength within a printed object in every direction.

Figure 3A:
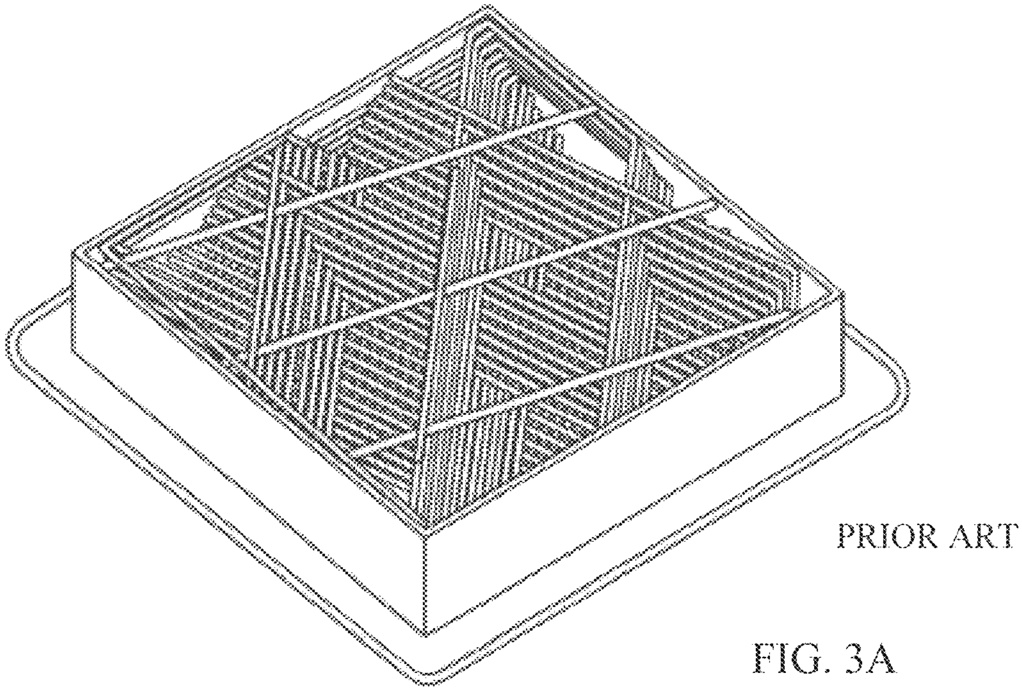
PRIOR ART FIG. 3A
FIGS. 3A and 3B illustrates 3D infill patterns that are more specifically three-dimensional in nature.
Figure 3B:
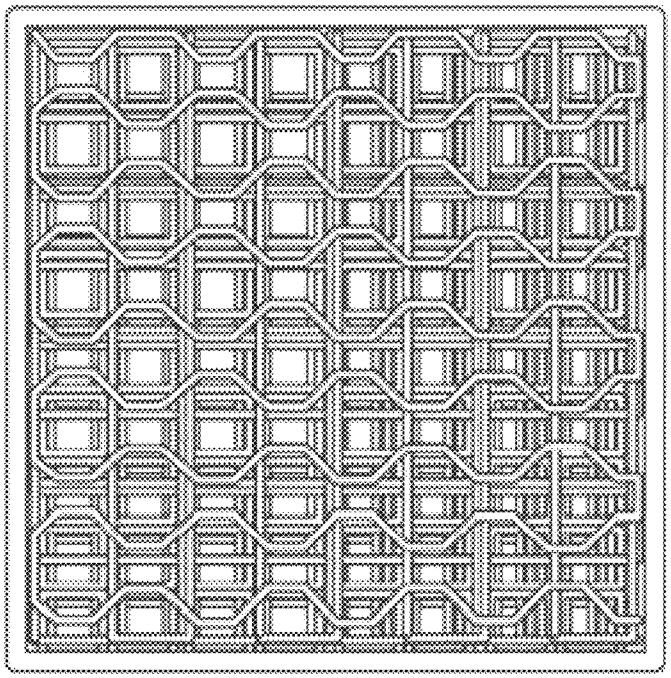
PRIOR ART FIG. 3B

FIGS. 3A and 3B illustrate two different of 3D infill patterns that are more specifically three-dimensional in nature. Although 2D fill patterns may take into account and adjust for infill lines in prior layers, 3D fill patterns are truly three-dimensional and designed to create a specific 3D dimensional infill. The 3D fill pattern shown in FIG. 3A is cubic and in FIG. 3B 3D honeycomb is shown.

Figure 4:
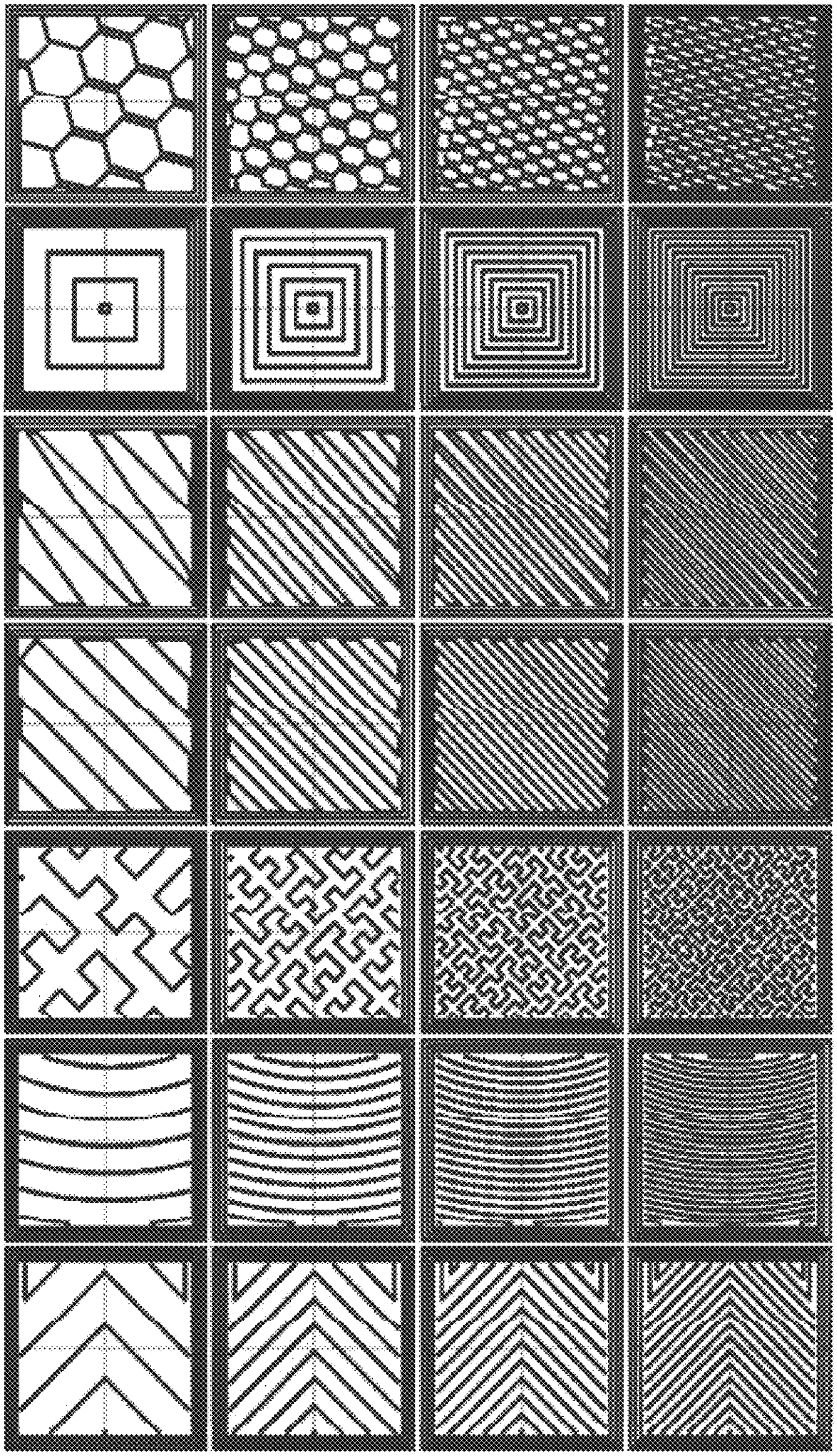
PRIOR ART FIG. 4
FIG. 4 illustrates the effect of fill density on where infill lines are placed for different 2D infill patterns.

FIG. 4 illustrates the effect of fill density on where infill lines are placed for different 2D infill patterns. From left to right, the fill densities are 20%, 40%, 60%, and 80%. From top to bottom, the fill patterns are Honeycomb, Concentric, Line, Rectilinear, Hilbert Curve, Archimedean Chords, and Octagram Spiral.

These above described infill setting directly affect the resulting porosity of the infill of an object. Through variation of these manufacturing parameters, the porosity of a mold created by an additive manufacturing device, e.g., a 3D printer, can be tailored for use with molded fiber.

Some slicing software provides for additional controls on the infill created by the printer when making an object. For example, the open source Slic3r software product includes the following advanced infill parameters which could be modified to adjust the porosity of the final object and also change the fouling performance of the object as a forming or other process mold:

- Infill every n layers—Will produce sparse vertical infill by skipping a set number of layers. This can be used to speed up print times where the missing infill is acceptable.
- Only infill where needed—Slic3r will analyze the model and choose where infill is required in order to support internal ceilings and overhangs. Useful for reducing time and materials.
- Solid infill every n layers—Forces a solid fill pattern on the specified layers. Zero will disable this option.
- Fill angle—By default the infill pattern runs at 45° to the model to provide the best adhesion to wall structures. Infill extrusions that run adjacent to perimeters are liable to de-laminate under stress. Some models may benefit from rotating the fill angle to ensure the optimal direction of the extrusion.
- Solid infill threshold area—Small areas within the model are usually best off being filled completely to provide structural integrity. This will however take more time and material, and can result in parts being unnecessarily solid. Adjust this option to balance these needs.
- Only retract when crossing perimeters—Retracting, to prevent ooze, is unnecessary if the extruder remains within the boundaries of the model. Care should be taken if the print material oozes excessively, as not retracting may result in enough material loss to affect the quality of the subsequent extrusion. However, most modern printers and materials rarely suffer from such extreme ooze problems.
- Infill before perimeters—Reverses the order in which the layer is printed. Usually the perimeter is laid down initially, followed by the infill, and this is usually the preferable as the perimeter acts as a wall containing the infill.

Other parameters may be available in different slicer software packages and custom parameters may be developed specifically to control porosity of the finished mold. For example, sophisticated slicer programs now allow a user to designate different portions within a model and separately assign print parameters to each portion. This allows a user, for example, vary the infill pattern and infill density between different locations within an object when it is printed.

It has been determined that certain combinations of infill patterns and infill density selections create porous molds with small enough pore sizes as to be suitable for use as forming and process molds for molded fiber production. It has been determined any infill pattern set to a infill density of from 40-85% will create an interior infill region sufficiently porous to allow a pressure differential to draw water from a fiber slurry through the interior of the printed mold while preventing substantial amounts of fiber flowing through the mold. Furthermore, it appears that the use of either the rectilinear or gyroid infill patterns at a fill density of between 20-85% or more narrowly between 70-80% for fiber contact surfaces (see below regarding how fiber contact surfaces are made) are particularly suitable for use in created porous molds for molded fiber part manufacturing.

In addition to the infill print parameters, it has been determined that exterior print parameters have an effect on the overall porosity of printed molds. Typically, a printed object will be provided with a continuous exterior surface and most slicer software is set to default to having the entire exterior of the object have one to three layers of material, that is the default setting are that all exterior surfaces of an object will have from one to three layers of material between the exterior of the object and the infilled region of the object. This, of course, renders such objects non-porous as there is no open connection between the exterior of the completed object and the porous infill.

It has been determined that setting the parameters related to the number layers for the exterior surface to "zero" results in the printer creating an object with no external surface, or skin, thus exposing the infill region to the external environment. Effectively, this creates a fiber contact surface on the mold with a large number of pores connecting the infill structure created by the layers of infill pattern to the external environment. With this technique, a porous mold may be easily created using commonly available additive manufacturing equipment and software.

Multiaxis 3D Printing of Molds

Figure 5:
FIG. 5 is a picture of a porous forming mold made using a traditional single-layer 2D printer.

FIG. 5 is a picture of a porous forming mold manufactured using the techniques described herein. The mold was manufactured on a single-layer printer (i.e. a single-layer or two dimensional [2D] printer is a printer that prints a first layer in the X-Y plane (or r-Θ plane if in polar coordinates), raises the print head the distance of one layer thickness in the Z-axis, then prints a second layer on top of the first layer, and so on to form the final physical object) and is a single-zone mold in which the fill density and fill pattern was set to a single value throughout the mold. The porous forming mold was printed in blue PLA and is shown attached to a forming machine base (colored red to distinguish it from the mold) to create a simple former. The forming machine base is non-porous and provides a substantially air-tight connection between a hose connected to a blower and the back side of the porous mold. Depending on the direction of airflow from the blower, this set up allows a suction to be drawn though the mold. The pressure differential from the suction draws water from the fiber slurry through the blue porous mold into the chamber formed by the forming machine base, thereby leaving a layer of fibers deposited on the surface of the forming mold. Alternatively, forced air from the blower could be passed through the forming machine base to blow through the mold from the back of the mold to the fiber contact surface of the mold to dislodge the molded fiber part on the fiber contact surface and to clean the mold of any fouling.

The forming mold in FIG. 4 was printed on an Ultimaker® S5 3D printer using MatterHackers® brand PLA. The mold's model was created using Solidworks® modeling software and shaped to create a simple molded fiber bowl having several intermediate side steps, a pair of dimples and a central trough. The mold model sliced using Cura slicing software from Ultimaker® with the following slicer program settings:

First Layer Height: 0.2 mm
Layer Height: 0.1 mm
Vertical Shell (Number of Perimeters): 0
Horizontal Shells: (Number of layers): 0
Fill Density: 70%
Fill Pattern: gyroid An inspection of FIG. 5 shows a drawback when printing porous molds on an X-Y axis printer. This forming mold was printed with the center axis of the cylinder as the Z-axis. Note that the top flat surfaces exhibit a smooth surface with multiple penetrations providing access to the interior of the infill pattern whereas the lateral curved sides appear as a series of alternating ridges and valleys creating an almost continuous solid lateral surface. This effect, which is due to the infill pattern being oriented in X-Y space, results in the surfaces of the lateral curved sides having a different surface porosity than the top flat surfaces. This anisotropy in surface porosity, which may also be referred to as the surface mesh size, affects the pressure gradient at the surface and thus the amount of fiber that is deposited onto the different surfaces of the forming mold. Such differences in fiber deposition can cause problems in the final part.

The inventors suggest reducing the surface porosity differences between surfaces by using a multi-axis 3D printer and printing the forming mold orthogonally to the fiber contact surface. By 'orthogonally printing' herein it is meant that the material layer is laid down so that the layer forms the fiber contact surface. That is, that the orthogonally printed outermost layer is, itself, the fiber contact surface, rather than portions of multiple 2D printed layers forming the external surface as shown in FIG. 5. This allows the infill pattern to be substantially orthogonally-oriented at most if not all points of the fiber contact surface, instead of the result of using a Z-axis-oriented infill pattern. That is, using a multi-axis filament printer as an example, extruding the filament on a 3D toolpath that follows the object's surface at all points on the surface to create an infill patterned oriented orthogonally to the surface will result in a more uniform surface porosity across the fiber contact surfaces of the mold. Multi-axis 3D printers are available, for example using a filament print head at the end of a multi-axis (e.g., a five-axis or six-axis) robotic arm, that can follow any toolpath through 3D space without interfering with prior layers. Alternatively, in some systems the print bed may be rotated and spun under a fixed head. Such systems allow for 3D printing along any toolpath and are not limited to the X-Y toolpath of conventional 3D printers.

The surface-orthogonal printing technique for printing components with more uniform surface porosity can be done for the entire forming mold, essentially building the porous mold from the center of one side of the mold outwardly to the exterior surfaces. Alternatively, the interior of the mold can be printed in a conventional manner and the surface-orthogonal printing may be done for just some selected portion of the exterior of the mold, e.g., the final two to three millimeters of the mold surface. In addition, the surface-orthogonal printing can be done only for a layer that forms the fiber contact surfaces or could be done for all exterior surfaces of the forming mold including lateral surfaces designed to not be porous, such as platen contact points and connection surfaces.

In yet another embodiment, a previously created porous mold core may be provided and an exterior screen of layers may be printed onto the mold core using the multi-axis surface-orthogonal printing described above. This is similar to surface-orthogonally printing what is, in effect, a screen around the mold core. The surface-orthogonal printed screen will have an exterior that is the fiber contact surface which will have the precise surface porosity/mesh size desired. Through changing the print parameters of the screen, the manufacturer has easy control of the surface porosity. In addition, this allows mold cores to be reused by removing old, damaged or fouled screens from forming molds and then reprinting the screens on the mold core.

Figure 6A:
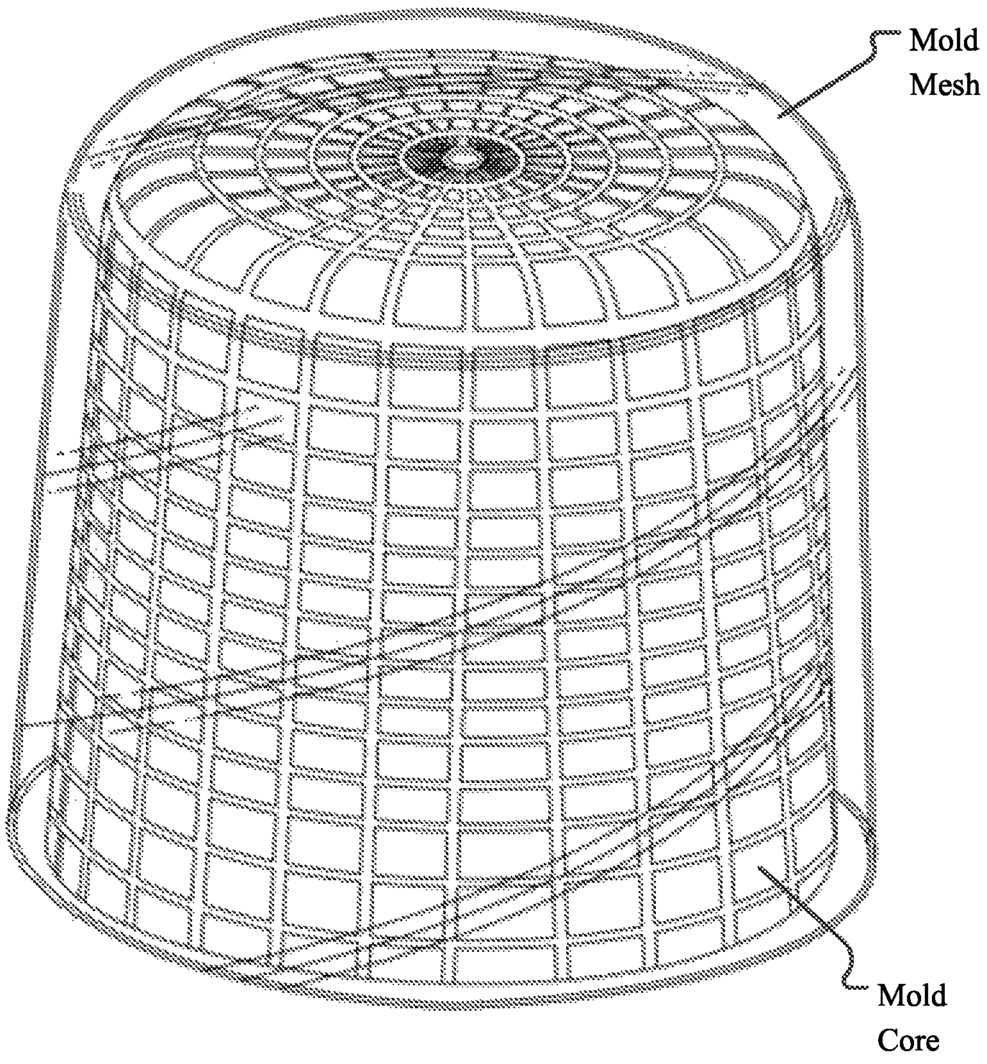
FIG. 6A illustrates a simple two-part tool in which a screen is printed around a mold core as a continuous screen made up of multiple 3D-printed layers deposited on the exterior of the mold core.

FIG. 6A illustrates a transparent view of a simple two-part tool in which a screen, referred to as the 'mold mesh' in the FIG., is printed around a mold core as a continuous surface layer. The mold core may be printed in conventional fashion and the mold screen printed onto the core later. The mold screen is porous, its porosity a result of the print parameters selected during the slicing of the mold screen model. The exterior surface of the mold screen is shaped as the negative of a portion of a molded fiber part to be made. Another surface of the mold screen is shaped to engage with the mold core while allowing fluid flow from the channels of the mold core through the porous screen.

In an embodiment, the mold screen may be assembled with the mold core after it is printed instead of printing the mold screen around the core. When assembled, the mold core and mold screen create a mold assembly with a porous exterior for use in manufacturing molded fiber parts. The two-part mold allows either component to be replaced in case of failure, fouling, or change in design of the part or the processing machine.

In alternative embodiments, multiple-part molds may be designed and used for complex molds or molds with different usability requirements. For example, molds with multiple, nested mold screen components may be used for very fine fiber slurries in which the fiber contacting mold screen is thin but has a relatively smaller average pore size. Essentially acting as a very fine screen created by 3D printing, the screen can be easily removed, replaced and recycled as needed.

Regardless of the number of components, each mold component can be made using an embodiment of the methods described herein. In addition, the porosity and pore size of each component may be tailored to meet desired attributes and performance for the mold assembly.

Figure 6B:
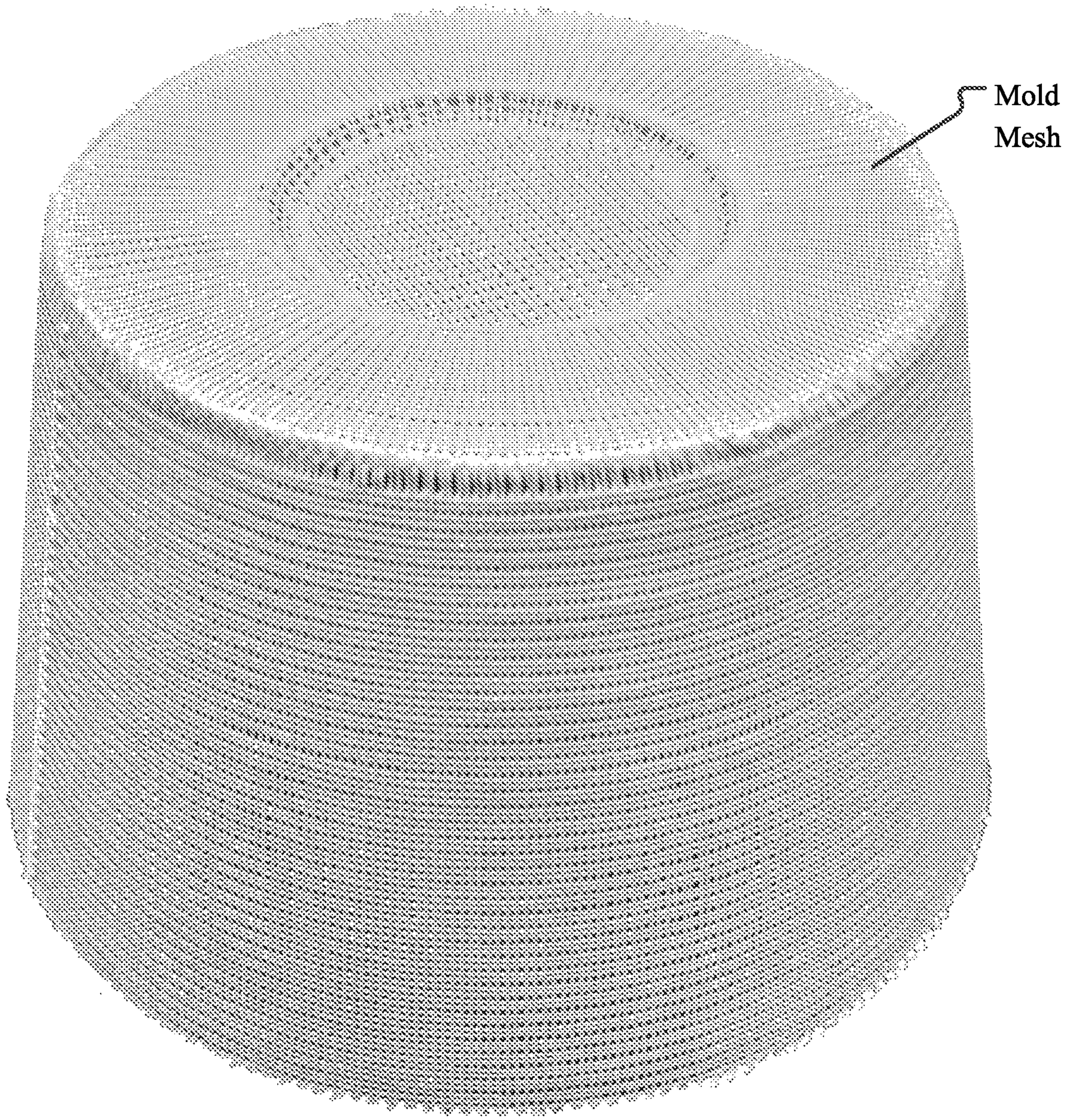
FIG. 6B is a picture of a 3D-printed version of the tool illustrated in FIG. 6A.

FIG. 6B is a picture of a 3D-printed version of the tool illustrated in FIG. 6A. FIG. 6B, especially when viewed in comparison to the tool shown in FIG. 5, shows that using the 3D printing method allows for much better control and uniformity of the porosity of the surface of the screen. In preliminary testing it appears that the porosity of the mold screen performed consistently as well as or exceeded a #60 mesh.

Figure 7:
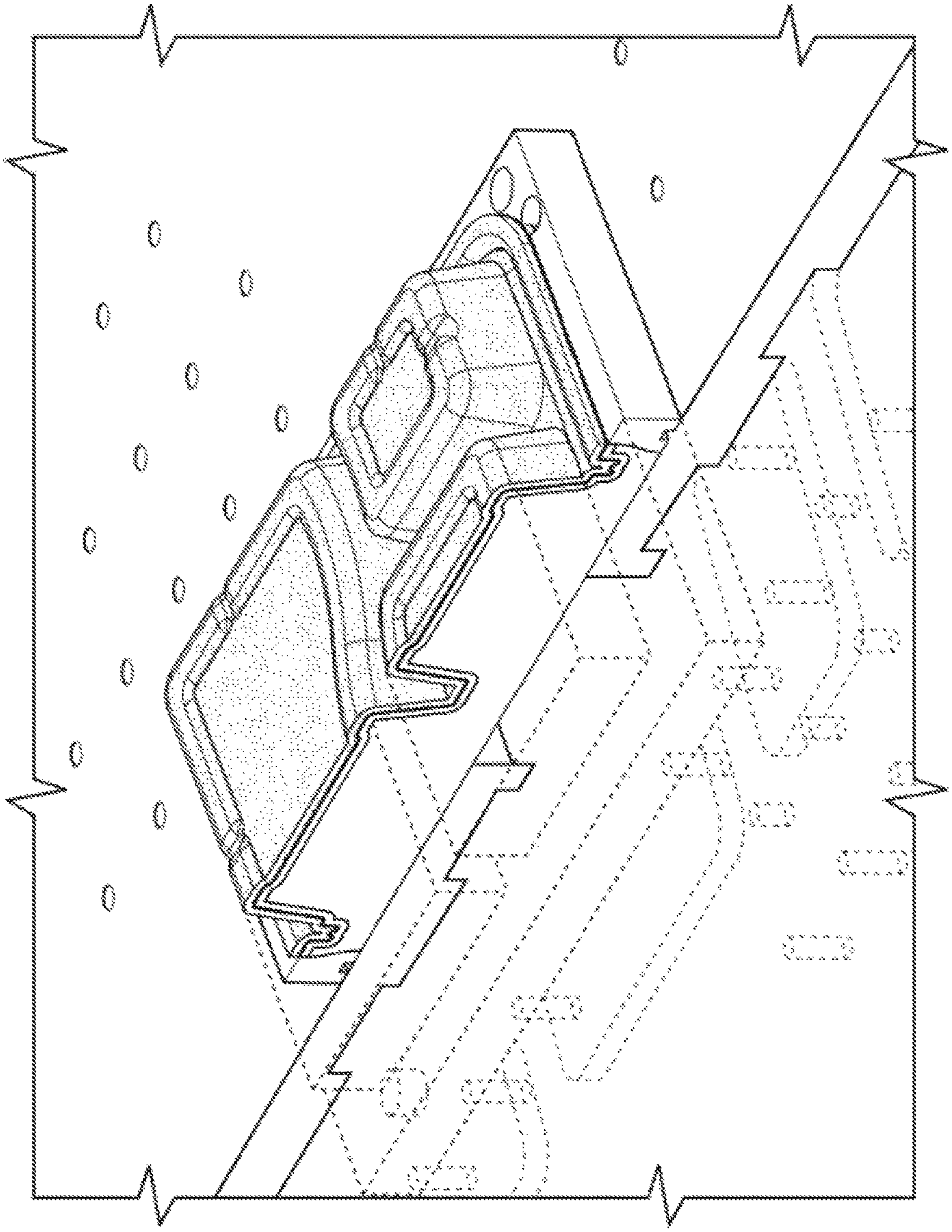
FIG. 7 illustrates another embodiment of a mold of a more complex design assembled with a platen of a process machine.

FIG. 7 illustrates another embodiment of a mold of a more complex design assembled on a platen of a process machine. The mold is for a three compartment molded fiber tray. The screen of the mold is shown in blue and the inner portion is shown in brown. As indicated in FIG. 7, the outer portion, or screen, is made using the surface-orthogonal printing technique and provided with a more dense orthogonally-oriented infill pattern creating, as much as possible, a uniform series small pores in the exterior fiber contact surface and, effectively, an outer screen of lower porosity and/or lower pore sizes. The inner core portions of the mold are created with a lower fill density thereby decreasing the resistance to fluid flow through this region and distributing the pressure differential more evenly across the outer surface portion of the mold.

Multi-Axis Surface-Orthogonal Porous Mold Manufacturing Method

Figure 8:
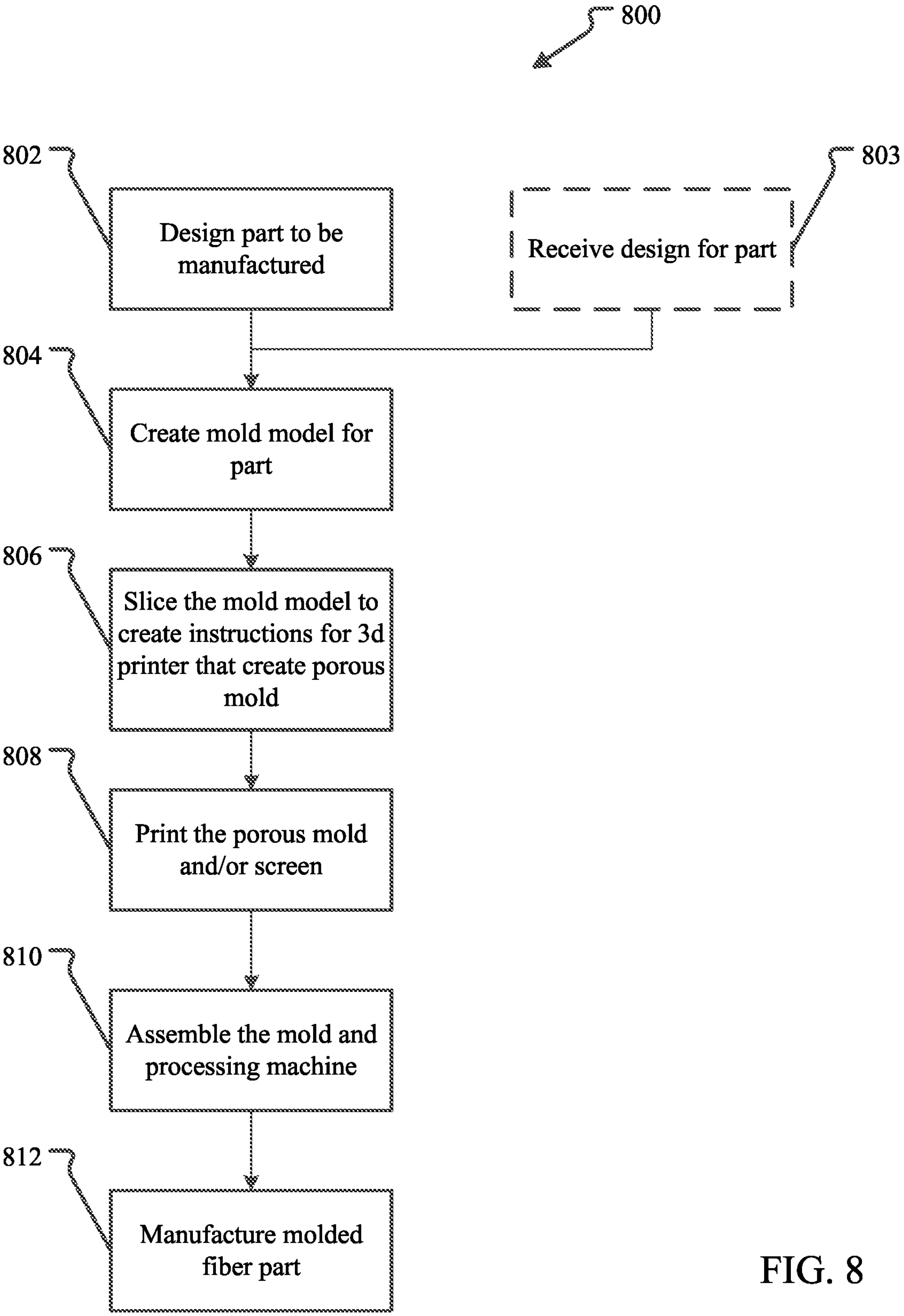
FIG. 8 illustrates an embodiment of a method of multi-axis additive manufacturing of a porous forming mold.

FIG. 8 illustrates an embodiment of a method of multi-axis additive manufacturing of a porous forming mold. In the embodiment shown, the method 800 uses a multi-axis 3D printer. Any multi-axis additive manufacturing system now known or later developed may be used. However, in the embodiment described below, the multi-axis 3D printer is a robotic workcell containing a 5-or 6-axis robot end effector is a thermoplastic filament extruder. Alternatively, the robot end effector could be a thermoplastic pellet extruder. The thermoplastic may be a composite, e.g. embedded pulp fiber in the thermoplastic.

In the embodiment shown the method 800 starts with the design of the part to be manufactured out of molded fiber in a part design operation 802. This operation 802 may include modeling the part using the same or different software used in the later development of the mold model. Alternatively, the part design may be provided by and received from a third-party as shown by operation 803.

Given the part design, the mold model can be created in a mold modeling operation 804. In this operation 804, the a mold model having 1) an exterior surface that is the negative shape of one side of the part and 2) an attachment surface or surfaces for attaching the mold to a process machine are defined and designed. In an embodiment the attachment surfaces of the mold model may further include openings, areas, or other features that control the flow of fluid (e.g., air or water) through the mold, such as by allowing the mold to communicate with a pressurization system connected to the process machine. Likewise, openings or spaces for heaters, sensors, connectors, or other ancillary components could also be designed into the mold model in anticipation of those components being installed after the mold is manufactured.

The mold model is then sliced using a slicer in a slicing operation 806 to generate a slicer file that can be interpreted by a multi-axis 3D printer or other additive manufacturing device to generate a physical print of the modeled mold. As described above, the print parameters used are selected to achieve a desired porosity in the mold. In particular, the slicer file includes the instructions for printing, using a multi-axis devise, a continuous external surface layer with a surface-oriented orthogonal infill pattern that will be the screen for the mold. In an embodiment, the slicer file may include instructions for printing the entire mold or just the screen.

The slicer file is then provided to a suitable 3D printer to other multi-axis additive manufacturing device which then prints the porous mold or the screen in a printing operation 808.

The mold consisting of the screen and core is then assembled with a molded fiber processing machine, such as former, hot press, trimmer, transfer robot, labeler, or palletizer, in a machine assembly operation 810, noting that some processing machines require two complimentary molds, one for the inner concave surface of the fiber part (sometimes called the core mold) and one for the convex surface of the fiber part (sometimes called the cavity mold).

The assembled molded fiber processing machine is then used in a manufacturing operation 812 in the processing, e.g., forming, pressing, transferring, etc., of the molded fiber part designed in the part design operation 802.

The porous mold may be moved to different processing machines during the manufacturing of multiple copies of molded fiber parts. When the mold wears out, it may be recycled and the material reused to create another porous mold.

In an embodiment of the method 800, a previously-created mold core is used and the fiber contact screen is printed onto the mold core by the multi-axis 3D printer. In this embodiment, a mold core is installed in the workcell in a mold core installation operation that is part of the print operation 808. This may include aligning the mold core at a given location within the workcell or training the robot as to the location of the mold core within the workcell prior to the beginning of the actual printing operation 808.

The 3D printer is then given the print command causing it to surface-orthogonally print the porous screen onto the mold core. The porous screen extrusion is contoured to the surface of the mold core. As opposed to traditional 3D printing where toolpaths are planar, each layer of the mesh screen follows the contour of the mold core. The porous screen is built up in layers, growing from the surface of the mold core, until a porous surface layer is formed that matches the surface of the molded fiber product to be created using the forming mold. In an embodiment, the porous screen is from 0.25-10 mm in thickness. In more precise embodiments, the porous screen is from 0.5-5 mm, from 0.75-4 mm, from 1-3 mm, or even from 1.5-2.5 mm in thickness.

Integrated Manufacturing Method

Figure 9:
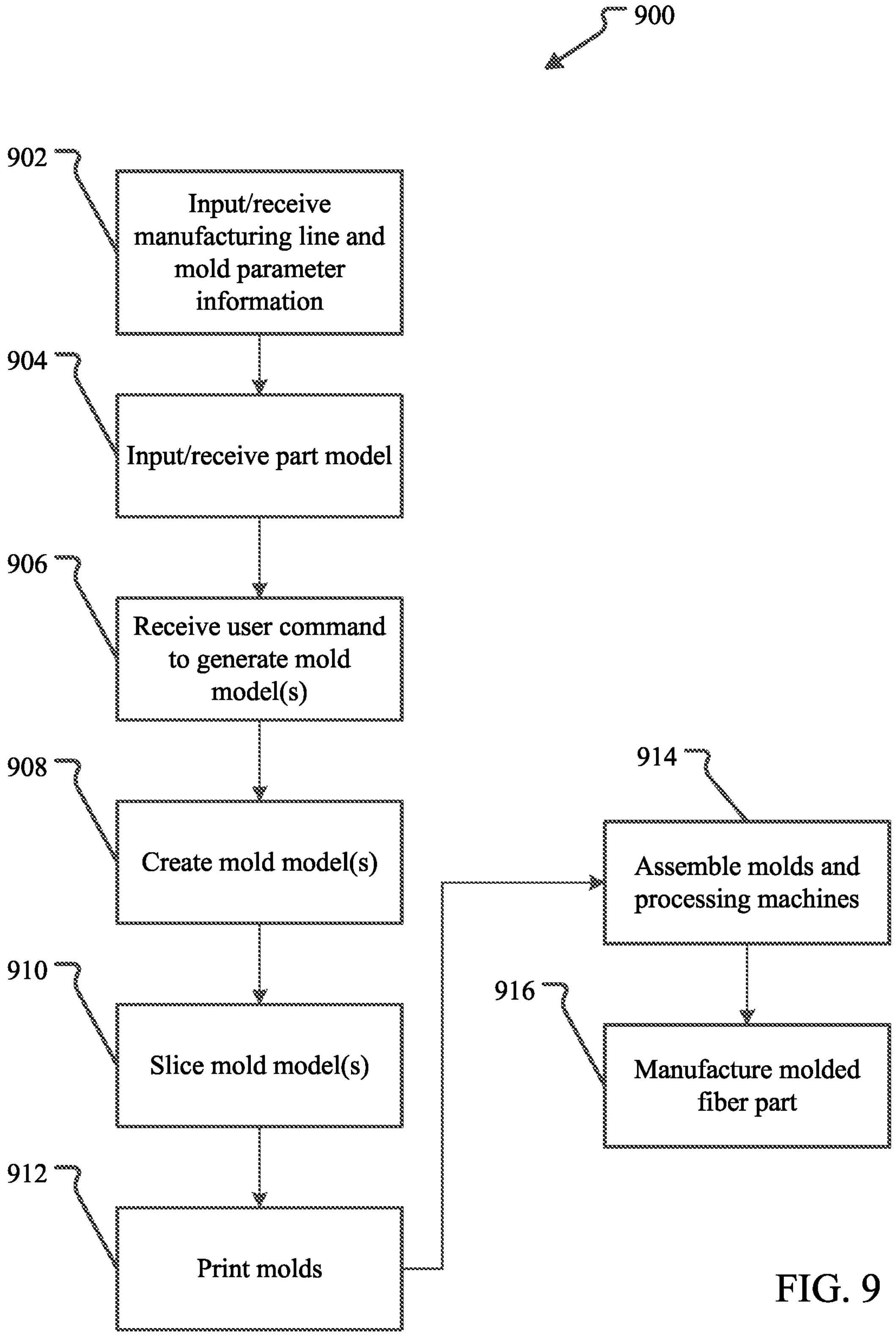
FIG. 9 illustrates an embodiment of an integrated manufacturing method for generating a set of molds for a molded fiber part manufacturing line or manufacturing cell.

FIG. 9 illustrates an embodiment of an integrated manufacturing method for generating a set of molds for a molded fiber part manufacturing line or manufacturing cell. In the embodiment, a manufacturing line includes some number of components, such as formers and subsequent processing machines as described above, each with a known number and type of mold.

For example, in an embodiment a manufacturing line includes i) a former with two forming surfaces each surface with four forming molds (so a total of eight forming molds); ii) six hot presses each with four processing molds matching the forming mold and four processing molds that define the shape of opposite side of the part (a total of four pairs of molds or eight molds per press, i.e., 48 press molds) and iii) finally, each hot press is provided with a transfer robot in the form of a transfer gantry that picks up four parts from the former at a time, places them on the hot press, after pressing removes them from the hot press, and transfers the finished parts to a palletizer for packaging (thus a total of 24 transfer molds).

Thus, in this embodiment, to retrofit the manufacturing line to make a new part, some 80 molds of four different types need to be manufactured. However, the shapes of the molds are dictated by the shape of the part to be made and the properties of the molds (e.g., porosity) are known. Therefore, given the model of the part to be made, the models of the molds can be generated. The method 900 uses this relationship between the model of the part and the molds needed for the manufacturing line to generate the set of molds from the model of the part.

The method starts with a manufacturing line and mold parameter receiving operation 902 in which the operator inputs the number and type of molds used in the manufacturing line (e.g., in this embodiment 80 molds comprising 8 forming molds, 24 hot press molds matching the forming molds, 24 hot press molds for the opposite side of the part, and 24 transfer molds) into a mold model generation computer program.

The operator also inputs the basic physical shape and internal design for each type of mold necessary for each mold type to be connected physically, pneumatically, and otherwise (e.g., electrically or for heat transfer fluid connection as necessary depending on the heating technology used by the hot presses). In an embodiment, the basic shape for each type of mold, referred to as the “mold core,” may be the same allowing, for example, the forming molds and the hot press molds matching the forming molds to be identical and interchangeable between machines. (Such interchangeability may be useful in that molds used in the former may become too fouled for forming but may still be suitable for use as press molds, transfer molds, or another process mold, thus extending the usable life of forming molds.) In an alternative embodiment, each mold type may have a different core with its own basic shape and internal structure tailored to its particular machine and use.

The operator further dictates the parameters of the mold to obtain a mold with a specific porosity. In an embodiment, this may be done by selecting the specific parameters for the additive manufacturing of the molds including layer height, fill density and fill pattern. In an embodiment, the operator may be able to input different parameters for different portions of the mold. For example, the user may enter one set of parameters for the mold core and a different set of the parameters for the part contact surface of the mold, which will be generated later when the part shape is selected.

The result of the manufacturing line and mold parameter receiving operation 902 is information sufficient to generate a set of one or more mold core models. These mold core models may be unfinished models in that the shape of the surface upon which the part is formed is not included. In an embodiment, upon receipt of the part model, the fiber contact surface of the mold may be added so that a unitary mold can be printed from the model. Alternatively mold cores modeled in this operation may also be one component of a multi-part mold as discussed with reference to FIGS. 6A and 6B.

In yet another alternative, the mold cores may be a standard part onto which a screen will be printed or which will be assembled with a 3D printed screen. In this embodiment the mold core is a given structure and the modeling primarily consists of printing the screen and any other portions necessary between the given mold core and the fiber contact surface. This may be created as a single, surface-orthogonally printed layer over the mold core.

Next, the model of the desired part is obtained and input into the mold model generation computer program in a part model input operation 904. In an embodiment the model is a CAD/CAM model for the final molded fiber part. In an embodiment, the part model may be selected or otherwise identified by the user.

Next the user inputs a command to the mold model generation computer program to generate the mold models for the manufacturing line for that part model in a commend operation 906.

In response, the mold model generation computer program then creates a model for each mold type needed in a mold model(s) creation operation 908. Each mold type model includes the appropriate model core and the part contact surface that is the negative shape of one or the other side of the part in the model input into the program as appropriate. The mold type model further defines the fill density and the fill pattern necessary to achieve the desired porosity in each section of the mold, both in the mold core and the part contact surface.

The mold models are then sliced as described above in a slicing operation 910 and the appropriate number of molds of each type are then printed in a printing operation 912. The porous mold are then assembled with the appropriate processing machines in an assembly operation 914 and the molded fiber part matching the design input in operation 904 is manufactured in a manufacturing operation 916.

In an embodiment, the method 900 is, at least in part, performed by a software product executed on a general purpose computing device, such as a personal computer or an iPhone to generate the slicer file(s) from the input part model and the user selected print parameters. For example, in an embodiment operations 902 through 910 may be performed by the same software product on a single computing device. If that device is attached to a 3D printer, then it can also control the printing operation 912. Thus, in this embodiment, the software operator is provided the ability to quickly and easily retrofit an entire molded fiber a manufacturing line while needing only a computing device, 3D printer, and a model of the new molded fiber part for the manufacturing line to produce.

Figure 10:
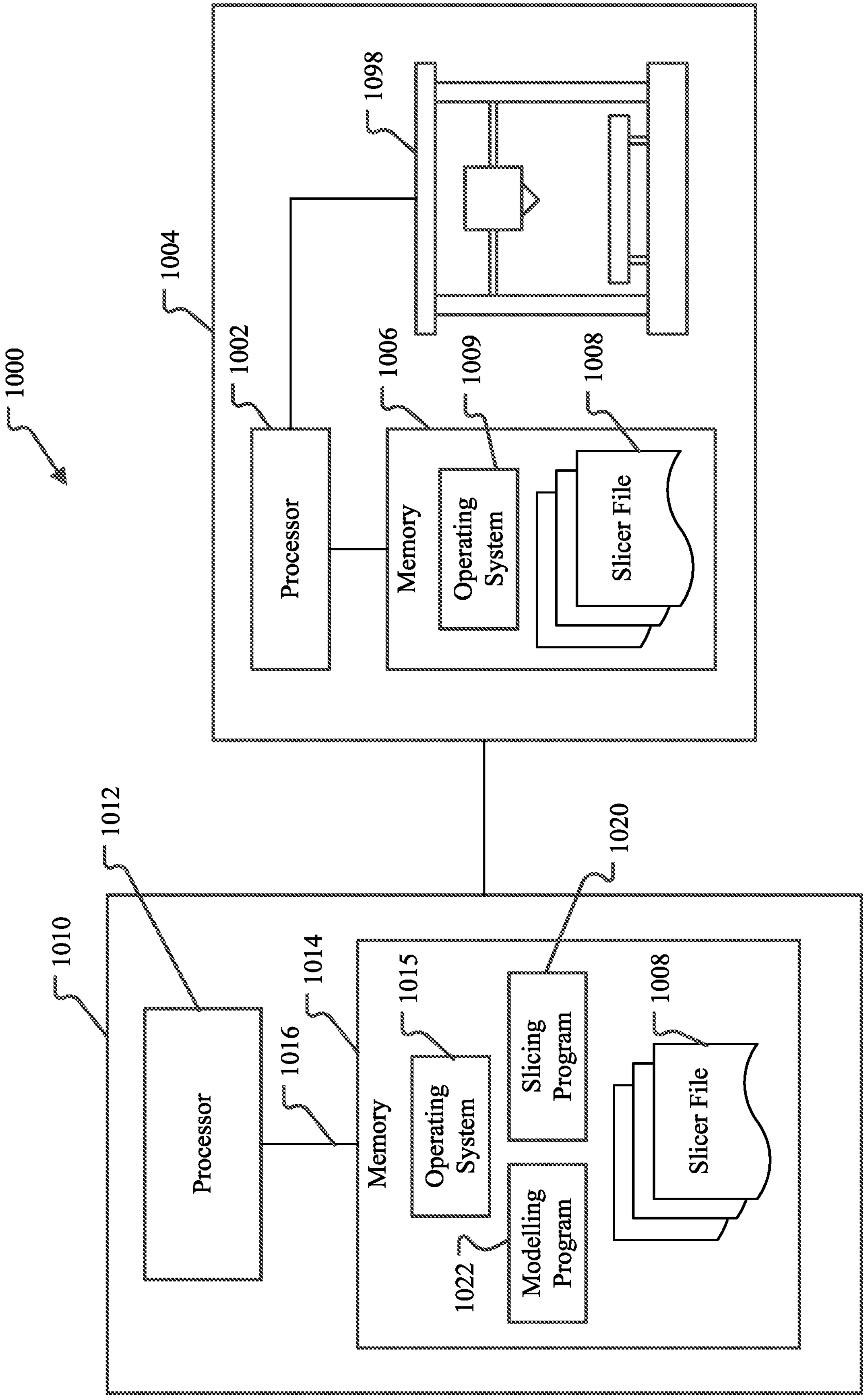
FIG. 10 illustrates a block diagram of components of an embodiment of a representative additive manufacturing system.

FIG. 10 illustrates a block diagram of the components of an embodiment of an additive manufacturing system 1000. In the embodiment shown, an additive manufacturing device 1004 includes the printer 1098 (that is, the hardware that does the actual printing, e.g., the gantry, extruder, nozzle, stepping motors, print bed, heaters, fans, power supply, etc.) which are controlled by an integrated control processor 1002. The additive manufacturing device 1004 may be any device that utilizes any of the additive manufacturing technologies described above including, for example, a 3D filament extruder/printer, a powder bed printer, photopolymer resin printer, a laser sintering printer, a 3D jet printer, a binder jetting printer, and a plasma deposition printer.

The control processor 1002 may be incorporated into the additive manufacturing device 1004 as shown, or may be part of a separate control computer (not shown). The control processor 1002 is coupled to a memory 1006. The memory 1006 is a computer-readable medium that contains the instructions for printing a particular mold or mold component. For example, in an embodiment the instructions are contained with a slicer file 1008. The memory 1006 may include multiple slicer files 1008 as shown, each slicer file for a different mold or mold component. The instructions are executable or interpretable by the control processor 1002 using its operating system software 1009 and, when executed, cause the device 1004 to manufacture a mold or mold component consistent with the model from which the instructions were created.

The system 1000 may also include the computer 1010 on which the 3D models are created and which also create the slicer files 1008. In the embodiment shown, the computer 1010 is a standard purpose computing device and includes at least one processor 1012 of its own, as well as a system memory 1014, and a system bus 1016 that couples the system memory to the computer processor. The system memory 1014 includes random access memory ("RAM") and read-only memory ("ROM"). A basic input/output system and operating system 1015 containing the basic routines that help transfer information between elements within the computer 1010, such as during startup, is stored in the ROM. Other components, not shown but known in the art, may be used such as a mass storage device, such as a hard disk or solid-state disk. It should be appreciated by those skilled in the art that computer-readable data storage media can be any available non-transitory, physical device, or article of manufacture from which the central display station can read data and/or instructions.

In general, computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information.

The computer 1010 is coupled to the control processor 1002 of the additive manufacturing device 1004. In the embodiment shown, the slicer file 1008 is generated on the computer 1010 and then transferred to the memory 1006 of the additive manufacturing device 1004 for later execution by the control processor 1002. Other configurations of a system 1000 are also possible and known in the art.

As described above, the slicer file 1008 is generated on the computer 1010 using slicer software 1020 stored on the memory 1014 of the computer 1010. Once the model of the mold is created using the modeling software 1022, the model is sliced to create the slicer file 1008. The instructions in the slicer file 1008 are generated based on the print parameters selected by the user. In an embodiment, for example, the slicing software converts the model into a g-code format file, which is specific code containing exact instructions for the additive manufacturing device 1004.

In addition to the claims, the following clauses describe aspects of the technology:

1. A porous mold for producing a molded fiber part comprising:
   - a 3D porous body having at least a first body surface and a second body surface not coplanar with the first body surface: and
   - a continuous, porous, fiber contact screen on the first body surface and the second body surface, the fiber contact screen containing a plurality of pores in fluid communication with the 3D porous body, the fiber contact screen created from a set of layers of material bonded together in a continuous fill pattern that, where adjacent to the first body surface, is orthogonal to first body surface and where adjacent to the second body surface is orthogonal to the second body surface.
2. The porous mold of clauses 1 or 2, wherein the porous mold further comprises a machine attachment surface shaped to engage a molded fiber processing machine and allow fluid flow between the 3D porous body and the molded fiber processing machine.
3. The porous mold of any of the above clauses, wherein the 3D porous body is created from a set of layers of material bonded together in a fill pattern that allows fluid flow through the 3D porous body.
4. The porous mold of any of the above clauses, wherein at least one of the 3D porous body and the continuous, porous, fiber contact screen is made of polyetherimide.
5. The porous mold of any of the above clauses, wherein at least one of the 3D porous body and the continuous, porous, fiber contact screen is stable at temperatures from 25° C. to 200° C.
6. The porous mold of any of the above clauses, wherein at least one of the 3D porous body and the continuous, porous, fiber contact screen was created as a single printed part by a multi-axis 3D printer.
7. The porous mold of any of the above clauses, wherein at least one of the 3D porous body and the continuous, porous, fiber contact screen is made of PLA.
8. The porous mold of any of the above clauses wherein the porous mold is created by an additive manufacturing device
9. The porous mold of any of the above clauses wherein the porous mold is created by a 3D extrusion printer
10. The porous mold of any of the above clauses wherein the fiber contact screen is created by an additive manufacturing device.
11. The porous mold of any of the above clauses wherein the 3D porous body or the fiber contact screen or both are made of ULTEM.
12. A computer-readable medium storing computer-readable instructions which, when acted upon by a 3D printer, cause the 3D printer to create a porous mold component, the porous mold component comprising:
    - a continuous, porous, fiber contact screen to be assembled on a 3D porous body:
    - the 3D porous body having at least a first body surface and a second body surface not coplanar with the first body surface; and
    - the continuous, porous, fiber contact screen containing a plurality of pores in fluid communication with the 3D porous body, the fiber contact screen created from a set of layers of material bonded together in a continuous fill pattern that when assembled with 3D porous body is orthogonal to first body surface where adjacent to the first body surface and where adjacent to the second body surface is orthogonal to the second body surface.
13. A method of manufacturing a porous mold for the creation of a molded fiber part, the method comprising:
    - defining a 3D exterior surface of the molded fiber part:
    - forming a fiber contact screen by printing at least two layers of material, wherein at least the first layer is laid down orthogonally to the 3D exterior surface.
14. The method of clause 13, further comprising:
    - assembling the fiber contact screen with a porous mold core to form the porous mold for the creation of the molded fiber part.
15. The method of clause 13 or 14, wherein forming the fiber contact screen further comprises:
    - defining a shape of the fiber contact screen; and
    - slicing the shape into at least two layers orthogonal to the 3D exterior surface of the molded fiber part.
16. The method of any of clauses 13-15, wherein forming the fiber contact screen further comprises:
    - printing a plurality of layers of material each layer substantially orthogonal to the 3D exterior surface.
17. The method of any of clauses 13-16, wherein an outermost printed layer of the at least two layers forms an exterior fiber contact surface of the fiber contact screen.
18. The method of any of clauses 13-17, wherein the at least two layers have gaps allowing water to penetrate the layers.
19. The method of any of clauses 13-18, further comprising:
    - depositing fiber on the fiber contact screen to form the molded fiber part.
20. A porous mold for producing a molded fiber part comprising:
    - a 3D porous body having a plurality of external surfaces that are not coplanar; and
    - a continuous, porous, fiber contact screen on the plurality of external surfaces, the fiber contact screen containing a plurality of pores in fluid communication with the 3D porous body, the fiber contact screen created from a set of layers of material bonded together in a continuous fill pattern that, where adjacent to the plurality of external surfaces, is orthogonal to the external surfaces.

21. A porous mold for producing a molded fiber part comprising:

a 3D porous body: and a continuous, porous, fiber contact screen having a 3D external fiber contacting surface formed by a single 3D printed layer of material.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained.

Notwithstanding that the numerical ranges and parameters setting forth the broad scope of the technology are approximations, the numerical values set forth in the specific examples are reported as precisely as possible. Any numerical value, however, inherently contain certain errors necessarily resulting from the standard deviation found in their respective testing measurements.

It will be clear that the systems and methods described herein are well adapted to attain the ends and advantages mentioned as well as those inherent therein. Those skilled in the art will recognize that the methods and systems within this specification may be implemented in many manners and as such are not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. Numerous other changes may be made which will readily suggest themselves to those skilled in the art and which are encompassed in the spirit of the disclosure. For example, a molded fiber part mold is essentially a filter and the techniques described herein could be used to create filters with uniform porosities while also having convoluted and complex external 3D surfaces.

What is claimed is:

1. A porous mold for producing a molded fiber part comprising:

a 3D porous body having at least a first body surface and a second body surface not coplanar with the first body surface; and a continuous, porous, fiber contact screen on the first body surface and the second body surface, the fiber contact screen containing a plurality of pores in fluid communication with the 3D porous body, the fiber contact screen created from a set of layers of material bonded together in a continuous fill pattern that, where adjacent to the first body surface, is orthogonal to the first body surface and where adjacent to the second body surface is orthogonal to the second body surface, wherein an exterior fiber contact surface of the fiber contact screen is formed by an orthogonally printed outermost layer that follows a contour of the 3D porous body, wherein each layer in the set of layers follows the contour of the 3D porous body, and wherein the fill pattern is orthogonal to the contour of the 3D porous body to achieve a substantially uniform porosity across the exterior fiber contact surface.

2. The porous mold of claim 1, wherein the 3D porous body is created from a set of layers of material bonded together in a fill pattern that allows fluid flow through the 3D porous body.

3. The porous mold of claim 1, wherein at least one of the 3D porous body and the continuous, porous, fiber contact screen is made of polyetherimide.

4. The porous mold of claim 1, wherein at least one of the 3D porous body and the continuous, porous, fiber contact screen is stable at temperatures from 25° C. to 200° C.

5. The porous mold of claim 1, wherein at least one of the 3D porous body and the continuous, porous, fiber contact screen was created as a single printed part by a multi-axis 3D printer.

6. The porous mold of claim 1, wherein at least one of the 3D porous body and the continuous, porous, fiber contact screen is made of PLA.

7. The porous mold of claim 1, wherein the porous mold is created by an additive manufacturing device.

8. The porous mold of claim 1, wherein the porous mold is created by a 3D extrusion printer.

9. The porous mold of claim 1, wherein the fiber contact screen is created by an additive manufacturing device.

10. The porous mold of claim 1, wherein the 3D porous body or the fiber contact screen or both are made of ULTEM.

11. A computer-readable medium storing computer-readable instructions which, when acted upon by a 3D printer, cause the 3D printer to create a porous mold component, the porous mold component comprising:

a continuous, porous, fiber contact screen to be assembled on a 3D porous body;

the 3D porous body having at least a first body surface and a second body surface not coplanar with the first body surface; and the continuous, porous, fiber contact screen containing a plurality of pores in fluid communication with the 3D porous body, the fiber contact screen created from a set of layers of material bonded together in a continuous fill pattern that when assembled with the 3D porous body is orthogonal to the first body surface where adjacent to the first body surface and where adjacent to the second body surface is orthogonal to the second body surface, wherein an exterior fiber contact surface of the fiber contact screen is formed by an orthogonally printed outermost layer that follows a contour of the 3D porous body, wherein each layer in the set of layers follows the contour of the 3D porous body, and wherein the fill pattern is orthogonal to the contour of the 3D porous body to achieve a substantially uniform porosity across the exterior fiber contact surface.

12. A porous mold for producing a molded fiber part comprising:

a 3D porous body having a plurality of external surfaces that are not coplanar; and a continuous, porous, fiber contact screen on the plurality of external surfaces, the fiber contact screen containing a plurality of pores in fluid communication with the 3D porous body, the fiber contact screen created from a set of layers of material bonded together in a continuous fill pattern that, where adjacent to the plurality of external surfaces, is orthogonal to the external surfaces, wherein an exterior fiber contact surface of the fiber contact screen is formed by an orthogonally printed outermost layer that follows a contour of the 3D porous body, wherein each layer in the set of layers follows the contour of the 3D porous body, and wherein the fill pattern is orthogonal to the contour of the 3D porous body to achieve a substantially uniform porosity across the exterior fiber contact surface.

13. A porous mold for producing a molded fiber part comprising:

a 3D porous body; and a continuous, porous, fiber contact screen having a 3D external fiber contacting surface formed by a single 3D printed layer of material that follows a contour of the 3D porous body, wherein the fiber contact screen comprises a fill pattern that is orthogonal to the contour of the 3D porous body to achieve a substantially uniform porosity across the 3D external fiber contacting surface.

14. The porous mold of claim 1, wherein the exterior fiber contact surface is not formed by portions of multiple 2D printed layers.

15. The computer-readable medium of claim 11, wherein the exterior fiber contact surface is not formed by portions of multiple 2D printed layers.

16. The porous mold of claim 12, wherein the exterior fiber contact surface is not formed by portions of multiple 2D printed layers.

17. The porous mold of claim 13, wherein the exterior fiber contacting surface is not formed by portions of multiple 2D printed layers.

18. The porous mold of claim 1, further comprising a machine attachment surface shaped to engage a molded fiber processing machine and allow fluid flow between the 3D porous body and the molded fiber processing machine.

19. The porous mold of claim 12, further comprising a machine attachment surface shaped to engage a molded fiber processing machine and allow fluid flow between the 3D porous body and the molded fiber processing machine.

* * * * *